(12) United States Patent
Lee

(10) Patent No.: US 8,971,300 B2
(45) Date of Patent: Mar. 3, 2015

(54) SYSTEM AND METHOD OF WIRELESSLY COMMUNICATING WITH MOBILE DEVICES

(75) Inventor: Cooper G. Lee, Irvine, CA (US)

(73) Assignee: Wi-Fi Rail, Inc., Irvine, CA (US)

(*) Notice: Subject to any disclaimer, the term of this patent is extended or adjusted under 35 U.S.C. 154(b) by 129 days.

(21) Appl. No.: 12/841,491

(22) Filed: Jul. 22, 2010

(65) Prior Publication Data
US 2010/0284315 A1  Nov. 11, 2010

Related U.S. Application Data

(63) Continuation of application No. 11/839,992, filed on Aug. 16, 2007, now Pat. No. 7,768,952.

(60) Provisional application No. 60/838,752, filed on Aug. 16, 2006.

(51) Int. Cl.
*H04W 4/00* (2009.01)
*H04L 12/46* (2006.01)
(Continued)

(52) U.S. Cl.
CPC .......... *H04L 12/4641* (2013.01); *H04W 12/06* (2013.01); *H04W 84/005* (2013.01); *H04W 84/12* (2013.01)
USPC ........................................ 370/338

(58) Field of Classification Search
CPC ............................ H04W 84/12; H04W 80/04
USPC ....................... 370/310.2, 338, 401, 349, 331
See application file for complete search history.

(56) References Cited

U.S. PATENT DOCUMENTS

| 4,881,082 A | 11/1989 | Graziano |
| 6,285,674 B1 | 9/2001 | Soni et al. |

(Continued)

FOREIGN PATENT DOCUMENTS

| EP | 05/18596 | 12/1992 |
| EP | 0939571 A1 | 9/1999 |

(Continued)

OTHER PUBLICATIONS

Mike Ritter et al., "Mobile Connectivity Protocols and Throughput Measurements in the Ricochet Microcellular Data Network (MCDN) System", Mobicom 2001, Proceedings of the Seventh Annual International Conference on Mobile Computing and Networking, Jul. 16-21, 2001, Rome, Italy, ACM, 2001, pp. 322-331.

(Continued)

*Primary Examiner* — Chandrahas Patel
(74) *Attorney, Agent, or Firm* — Lando & Anastasi, LLP

(57) ABSTRACT

Systems and methods for providing network access to mobile devices that travel with a vehicle, such as a train, a bus, a boat, etc. along or adjacent to a relatively fixed path that may extend over a large geographic area. Mobile devices access the network through stationary access points arranged along or adjacent to the path and communicate with a communication network. The communication network may be arranged as an asynchronous transfer mode (ATM) local area network emulation (LANE) network. One of the mobile devices may be a mobile access point which can couple other mobile devices to the network and record authentication information of other mobile devices so that fast transitions can be made from one stationary access point to another as the vehicle moves along the path.

26 Claims, 10 Drawing Sheets

(51) Int. Cl.
*H04W 12/06* (2009.01)
*H04W 84/00* (2009.01)
*H04W 84/12* (2009.01)

(56) References Cited

U.S. PATENT DOCUMENTS

| | | | |
|---|---|---|---|
| 6,456,632 | B1 | 9/2002 | Baum et al. |
| 6,546,425 | B1 | 4/2003 | Hanson et al. |
| 6,587,457 | B1 | 7/2003 | Mikkonen |
| 7,082,116 | B2 * | 7/2006 | Reza et al. ............... 370/338 |
| 7,130,625 | B2 | 10/2006 | Akgun et al. |
| 7,158,777 | B2 | 1/2007 | Lee et al. |
| 7,174,456 | B1 | 2/2007 | Henry et al. |
| 7,509,410 | B1 * | 3/2009 | Medved et al. ........... 709/224 |
| 7,542,449 | B2 * | 6/2009 | Kim et al. ................ 370/331 |
| 7,545,754 | B2 | 6/2009 | Funato et al. |
| 7,548,526 | B2 | 6/2009 | Oba et al. |
| 7,606,242 | B2 | 10/2009 | Whelan et al. |
| 7,610,049 | B2 | 10/2009 | Watanabe |
| 7,620,401 | B2 | 11/2009 | Oh |
| 7,623,876 | B2 | 11/2009 | Sarikaya et al. |
| 7,688,801 | B2 * | 3/2010 | Dougherty et al. ........ 370/349 |
| 7,768,952 | B2 | 8/2010 | Lee |
| 7,787,402 | B2 | 8/2010 | Lee |
| 7,797,016 | B2 * | 9/2010 | Eran et al. ................ 455/525 |
| 7,801,143 | B2 * | 9/2010 | Gossain et al. ........... 370/394 |
| 8,423,070 | B2 * | 4/2013 | Scharf-Katz et al. ...... 455/522 |
| 2002/0022470 | A1 | 2/2002 | Ezuriko |
| 2002/0147023 | A1 | 10/2002 | Sawada et al. |
| 2003/0035437 | A1 | 2/2003 | Garahi et al. |
| 2003/0091030 | A1 | 5/2003 | Yegin et al. |
| 2003/0123448 | A1 | 7/2003 | Chang |
| 2004/0258008 | A1 | 12/2004 | Inoue et al. |
| 2004/0266444 | A1 | 12/2004 | Yano |
| 2005/0160169 | A1 | 7/2005 | Segal et al. |
| 2005/0220054 | A1 | 10/2005 | Meier et al. |
| 2005/0282546 | A1 | 12/2005 | Chang et al. |
| 2006/0179307 | A1 | 8/2006 | Stieglitz et al. |
| 2007/0104143 | A1 | 5/2007 | Hori |
| 2007/0140177 | A1 | 6/2007 | Li et al. |
| 2007/0249347 | A1 | 10/2007 | Saifullah et al. |
| 2007/0252761 | A1 | 11/2007 | Koorapaty et al. |
| 2007/0258108 | A1 | 11/2007 | Matsumoto et al. |
| 2008/0014940 | A1 | 1/2008 | Parron et al. |
| 2008/0042912 | A1 | 2/2008 | Lee |
| 2008/0125129 | A1 | 5/2008 | Lee |
| 2008/0225798 | A1 | 9/2008 | Trossen |
| 2008/0293413 | A1 | 11/2008 | Sharif-Ahmadi et al. |
| 2008/0317043 | A1 | 12/2008 | Dougherty et al. |

FOREIGN PATENT DOCUMENTS

| | | |
|---|---|---|
| WO | 02/23825 | 3/2002 |
| WO | 03096623 A1 | 11/2003 |

OTHER PUBLICATIONS

Kristina Dell, Blackberry's on a Plane, Dec. 7, 2007, pp. 1-2, www.time.com/time/business/article.

Matthew S. Gast, 802.11 Wireless Networks: The Definitive Guide, Second Edition, 2005, pp. 180-183, 438-442, O'Reilly Media, Inc., Sebastopol, CA.

Marina Aguado, Eduardo Jacob, Purificacion Saiz, Juan Jose Unzilla, M. Victoria Higuero, Jon Matias, Railway Signaling Systems and New Trends in Wireless Date Communication, 2005, pp. 1333-1336, Bilbao, Bizkaia, Spain.

PCT International Search Report and Written Opinion for PCT/US2007/076124 filed Aug. 16, 2007 mailed Jan. 22, 2008.

Extended European Search Report from corresponding European Application No. 07841026.3 dated Mar. 18, 2013.

Search Report from corresponding Taiwanese Application No. 096130452 dated Apr. 16, 2013.

* cited by examiner

SYSTEM AND METHOD OF WIRELESSLY COMMUNICATING WITH MOBILE DEVICES

CROSS REFERENCE TO RELATED APPLICATIONS

The instant application is a continuation under 35 USC §120 of U.S. patent application Ser. No. 11/839,992 filed Aug. 16, 2007, now allowed, which claims priority under 35 U.S.C. §119(e) to U.S. provisional patent application No. 60/838,752 filed Aug. 18, 2006 and entitled SYSTEM AND METHOD OF WIRELESSLY COMMUNICATING WITH MOBILE DEVICES, each of which is incorporated herein by reference. The instant application is related to the following co-pending applications: application Ser. No. 11/840,015, entitled SYSTEM AND METHOD OF AUTHENTICATING MOBILE DEVICES, now allowed, application Ser. No. 11/840,020, entitled SYSTEM FOR PROVIDING REDUNDANT COMMUNICATION WITH MOBILE DEVICES, and application Ser. No. 11/840,004, entitled ANTENNA SYSTEM FOR COMMUNICATING WITH MOBILE DEVICES, each filed on Aug. 16, 2007.

BACKGROUND

1. Field of Invention

The present invention relates to wireless communication and more particularly to wireless communication with a plurality of mobile devices.

2. Discussion of Related Art

Wireless networks provide mobility and convenience to users of various mobile devices. Such networks have become pervasive and may now be found in homes, workplaces, and even public and commercial spaces such as parks and coffee shops. Wireless network access is generally limited in range to an area relatively near a wireless access point. In public or commercial spaces, the area in which a wireless network is accessible is often referred to as a wireless hotspot. One popular wireless networking technology is referred to as Wi-Fi and is defined by the various IEEE 802.11 specifications.

A typical wireless network user may connect to a different wireless network in his or her home, at a local restaurant or coffee shop, and at his or her workplace. The user may also connect to a single wireless network through different access points as the user moves from one location to another, for example, as the user moves from one floor of an office building serviced by one wireless router to another floor of the same office building serviced by a different wireless router. Each connection to a new wireless network or a new access point generally requires establishing a new connection to the network. This may include authenticating the user and mobile device to a network authentication server before the user is allowed to fully access the network. When users are moving relatively quickly, such as when they are traveling along with a vehicle, such reauthentication may cause gaps in network connectivity.

Moreover, wireless networking may be limited by the active range of a wireless access point. So users may experience limited mobility based on the positioning and strength of a wireless access point through which they couple to a communication network. This range may be altered by environmental features, such as tunnels, walls, buildings, geography, etc, further limiting the range of wireless networks.

SUMMARY OF INVENTION

In accordance with one aspect of the present invention, it is recognized that establishing a new connection to a wireless network as a user moves among networks or access points may cause a break in network access leaving the user temporarily without network access. To help prevent such breaks in network access, a communication network may be configured to minimize the time needed to establish a new connection to the network. This may be accomplished, for example, by reducing the time needed to authenticate a user or mobile device with a network authentication server, or, for another example, by arranging access points into authentication groups having a shared authentication cache that may provide some authentication without communicating with the authentication server.

To further prevent such network access breaks, access points of a communication network may be disposed so that the range of each access point overlaps with the range of a neighboring access point. The overlap may be great enough so the mobile device may complete establishing a connection through the neighboring access point before leaving the range of the access point through which the mobile device currently accesses the network. Such an arrangement may allow a user to travel among neighboring access points without experiencing a break in network access.

In accordance with one aspect of the present invention, it is realized that mobile device users traveling on or in a vehicle along a path may desire wireless network access without access interruptions. For example, a plurality of users traveling on or in a vehicle, such as a train, boat, car, etc., moving from one location to another, such as from one train station to another, may want to access such a wireless network to check email, surf the web, access a work related virtual private network (VPN), etc. To facilitate such network access, a plurality of stationary access points may be arranged along or adjacent to the path traveled by the vehicle. The path and network may, thereby, span a large geographic area, such as from one city to another or from one state to another.

The plurality of stationary access points may be connected to each other and the network by wired or wireless communication methods. Each stationary access point of the plurality of stationary access points may be configured to forward data among the mobile devices and the network. Each stationary access point may be arranged to maintain a line of sight and a wireless communication channel with the mobile devices while they are in a communication range of the stationary access point to improve access quality as the mobile devices move along the path.

In accordance with one aspect of the present invention, it is recognized that establishing a new connection for a plurality of mobile devices at nearly the same time, such as when a vehicle carrying the plurality of mobile devices moves from one stationary access point to a new stationary access point, may delay the establishment of some of the new connections, for example because a bandwidth limit may be reached or an authentication server may be overwhelmed with authentication requests for each device of the plurality of mobile devices. To prevent such delay, the mobile device may include a mobile access point that is coupled to the vehicle and travels along with one or more other mobile devices, such as a mobile host device (e.g., a laptop, a PDA, a cellular telephone, etc.) or a mobile forwarding device (e.g., a router, a bridge, a switch, a repeater, etc.). The mobile access point may connect to the stationary access points disposed along the path. The other mobile devices may connect to the mobile access point in order to access the network associated with the stationary access points.

The mobile access point may record connection information, such as authentication information, for each mobile host device of the plurality of mobile host devices so that the mobile host devices can move among the access points without needing to reauthenticate or establish a new connection to a stationary access point. Rather, in such a configuration, the mobile access point may be the only device that may need to authenticate and establish such a new connection when the mobile host devices and mobile access point move among stationary access points, thereby limiting the amount of authentication and other new connection related traffic.

In accordance with another aspect of the present invention, it is recognized that certain types of network connection (e.g., secure socket layer (SSL), VPN, etc.) may depend upon a static network layer address (e.g., IP address) that may not be maintained as a user moves among access points of a conventional wireless network, especially a wireless network that spans a large geographic area. To maintain such network layer addresses as a mobile host device moves from one stationary access point to another of a communication network, devices of the communication network may be configured to transparently forward information through the communication network based on data link layer address information. For example, the communication network may be configured as an asynchronous transfer mode (ATM) local area network emulation (LANE) having virtual circuits connecting the mobile devices through the network. Such a configuration may allow mobile devices to maintain one network layer address as the devices travel among multiple stationary access points by updating the virtual circuits as the devices move.

Wireless communication used in various embodiments of the present invention may include any type of wireless communication between two or more devices without any direct mechanical attachment, such as radio frequency or optical communication. An example wireless communication that may be used includes any of the well-known IEEE 802.11 protocols.

Another aspect of the present invention includes a communication system. In some embodiments, the communication system comprises a plurality of stationary access points coupled to a communication network, and a mobile access point configured to communicate with the plurality of stationary access points and provide a plurality of host devices access to the communication network without address renegotiation, wherein the mobile access point and the plurality of host devices move relative to the plurality of stationary access points.

In one embodiment, the mobile access point communicates with at least one of the plurality of host devices using a wireless network. In another embodiment, the mobile access point communicates with the plurality of stationary access points using a wireless network. In some implementations, the wireless network may include a wireless network using an IEEE 802.11 protocol.

In some embodiments, the mobile access point is configured to provide the plurality of host devices access to the communication network through the wireless network to one stationary access point of the plurality of stationary access points at a time. In some implementations, the one stationary access point is a stationary access point of the plurality of stationary access points that provides a stronger wireless communication signal to the mobile access point than at least one other stationary access point of the plurality of stationary access points. In other embodiments, to provide access to the communication network to at least one of the plurality of host devices, the mobile access point communicates through a wireless network with a mobile forwarding device.

In some embodiments, the communication network is connected to an external communication network by a forwarding device. In some implementations, the forwarding device includes an edge router. In further implementations, data addressed to a network layer address of a first host device of the plurality of host devices and received by the forwarding device from the external communication network is forwarded from the forwarding device to the first host device through the mobile access point and at least one of the plurality of stationary access points based on a data link layer address of the first host device.

In other embodiments, the plurality of host devices includes at least one of a laptop computer, a personal digital assistant (PDA), and a cellular telephone. In still other embodiments, at least one of the plurality of stationary access points couples to the communication network through a wired connection. In further embodiments, a first stationary access point of the plurality of stationary access points couples to the communication network through a second stationary access point of the plurality of stationary access points. In some implementations, the first stationary access point couples to the communication network using a wired network to the second stationary access point. In other implementations, the first stationary access point couples to the communication network using a wireless network to the second stationary access point.

In some embodiments, the mobile access point is coupled to a vehicle. In some implementations, the vehicle includes at least one of a boat, a train, a bus, and a car. In one implementation, the vehicle moves along a path, and the plurality of stationary access points are arranged adjacent to the path.

Another aspect includes a method of forwarding data to a moving host device. In some embodiments, the method comprises acts of maintaining, in a first forwarding device of a plurality of forwarding devices of a communication network, forwarding information for the moving host device based on a data link layer address of the moving host device, receiving data addressed to a network layer address of the moving host device at the first forwarding device, and forwarding a representation of at least a portion of the received data along a path to the data link layer address of the moving host device based on the maintained forwarding information.

Some embodiments further comprise an act of addressing, at the first forwarding device, the representation of at least the portion of the received data to the data link layer address of the moving host device. In other embodiments, the act of maintaining comprises an act of establishing a new virtual circuit through at least a portion of a new path from the first forwarding device to the moving host device when the path to the moving host device from the first forwarding device changes. In some implementations, the first forwarding device includes a mobile access point.

In some embodiments, the first forwarding device includes at least one stationary access point. In some implementations, the at least one stationary access point includes a first stationary access point when the moving host device is in a first position and a second stationary access point when the moving host device is in a second position. One implementation further comprises establishing a first wireless connection between the first stationary access point and a mobile access point when the moving host device is in the first position and establishing a second wireless connection between the second stationary access point and the mobile access point when the moving host device is in the second position.

In other embodiments, the moving host device includes at least one of a laptop computer, a personal digital assistant (PDA), and a cellular telephone. In still other embodiments, the act of maintaining includes acts of sending, responsive to the path to the moving host device from the first forwarding device changing, updated forwarding information to the first forwarding device through the communication network along at least a portion of the changed path; and associating, at any forwarding devices along the portion of the changed path and the first forwarding device, the updated forwarding information with the moving host device. In some implementations, the act of associating includes an act of establishing a new virtual circuit from the mobile host device to the first forwarding device. In some embodiments, the act of forwarding comprises an act of forwarding a plurality of asynchronous transfer mode (ATM) cells, wherein each of the cells includes at least a portion of the representation of the portion of the received data. In other embodiments, the act of forwarding comprises an act of forwarding the representation using ATM local area network emulation (LANE) to the moving host device.

A further aspect includes a communication system comprising a first antenna system comprising a plurality of first antennas mounted to a first supporting structure, each of the plurality of first antennas having a main lobe oriented in a different direction; and a second antenna system comprising a plurality of second antennas mounted to a second supporting structure, each of the plurality of second antennas having a main lobe oriented in a different direction, the main lobe of at least one of the plurality of second antennas being oriented in a direction opposing the main lobe of at least one of the plurality of first antennas, wherein the first antenna system and the second antenna system are disposed at spaced apart positions along or adjacent to a path traversed by a vehicle, such that the vehicle does not substantially obstruct the main lobes of the plurality of first antennas or the plurality of second antennas as the vehicle traverses the path.

In some embodiments, at least 40% of an energy radiated from a first antenna of the plurality of first antennas and from a second antenna of the plurality of second antennas is not obstructed by the vehicle as the vehicle traverses the path. In other embodiments, the first antenna system includes at least one of a battery and a solar power supply configured to power the plurality of first antennas.

Still other embodiments further comprise a mobile antenna coupled to the vehicle, wherein the first antenna system is configured to communicate with the mobile antenna through at least one of the plurality first antennas when the mobile antenna is within a communication range of the first antenna system, and the second antenna system is configured to communicate with the mobile antenna through at least one of the plurality of second antennas when the mobile antenna is within a communication range of the second antenna system. In some implementations, the communication range of the first antenna system overlaps the communication range of the second antenna system. In other implementations, each of the first and second antenna systems is coupled to a communication network. In some implementations, the first antenna system is coupled to the communication network through a wired connection. In some implementations, the second antenna system is coupled to the communication network through the first antenna system. In one implementation, the second antenna system is coupled to the communication network through the first antenna system by a wired connection to the first antenna system. In other implementations, the second antenna system is coupled to the communication network through the first antenna system by a wireless network with the first antenna system. In one implementation, the first antenna system includes at least one third antenna communicating over the wireless network to at least one fourth antenna of the second antenna system to couple the second antenna system to the communication network through the first antenna system. In another implementation, the wireless network includes a wireless network using an IEEE 802.11 protocol.

In other embodiments, the mobile antenna is coupled to a mobile access point configured to provide a plurality of host devices access to the communication network through communication with the first and second antenna systems. In still other embodiments, the plurality of host devices includes at least one of a laptop computer, a personal digital assistant (PDA), and a cellular telephone. In yet further embodiments, the mobile access point is configured to provide access to the communication network through the first antenna system when a first signal strength of the first antenna system is stronger than a second signal strength of the second antenna system. In some implementations, the mobile access point is configured to provide access to the communication network through the second antenna system when the second signal strength is stronger than the first signal strength. In other implementations, the mobile access point is configured to authenticate with the second antenna system before the second signal strength is stronger than the first signal strength. In some other implementations, the mobile access point communicates with the first and second antenna systems through a wireless network. In one implementation, the wireless network includes a wireless network using an IEEE 802.11 protocol.

In further embodiments, the mobile access point communicates with the plurality of host devices through at least one wireless network. In one implementations, the wireless network includes a wireless network using an IEEE 802.11 protocol.

Yet a further aspect includes an antenna system for communicating with a mobile device, comprising a support; a plurality of first antennas mounted to the support, each first antenna of the plurality of first antennas being configured to communicate with the mobile device when the mobile device is more than a minimum communication distance from the support and less than a maximum communication distance from the support; and at least one second antenna mounted to the support and configured to communicate with the mobile device when the mobile device is less than the minimum communication distance from the support.

In some embodiments, the communication system further comprises at least one connection device coupled to the support and configured to communicate with a communication network. In some implementations, the mobile device includes a mobile access point and the communication system is configured to provide access to the communication network to a plurality of host devices coupled to the mobile access point by communicating with the mobile access point through at least one of the plurality of first antennas and the at least one second antenna.

In other embodiments, the at least one connection device comprises a plurality of third antennas mounted to the support. In some implementations, at least one antenna of the plurality of third antennas is configured to communicate with at least one second communication system. In some implementations, the at least one antenna of the plurality of third antennas is configured to communicate with the communication network through a wireless network with the at least one second communication system. In one implementation, the wireless network includes a wireless network using an IEEE 802.11 communication protocol.

In other embodiments, the at least one connection device comprises a wired connection to the communication network. In one implementation, the wired connection includes at least one of a wire and an optical fiber. In other implementations, the wired connection connects the communication system to a forwarding device coupled to the communication network. In still other implementations, the wired connection to the communication network includes at least one wired connection to at least one second communication system. In another embodiment, the plurality of first antennas are parabolic dish antennas and the at least one second antenna is an omnidirectional antenna.

A still further aspect of the present invention includes a mobile communication system comprising a first communication system configured to communicate with at least one host device; and a second communication system configured to communicate with a plurality of stationary access points and the first communication system, wherein the mobile communication system is configured to authenticate the second communication system with a first stationary access point of the plurality of stationary access points by authenticating the second communication system with an authentication server, and wherein the mobile communication system is further configured to authenticate the second communication system with a second stationary access point of the plurality of stationary access points without reauthenticating the second communication system with the authentication server.

In some embodiments, the mobile communication system is configured to authenticate the second communication system with the second stationary access point by accessing an authentication cache indicative of whether the second communication system has previously been authenticated by the authentication server. In other embodiments, the second communication system and the plurality of stationary access points communicate wirelessly.

In still other embodiments, the first communication system is configured to provide, to the at least one host device, access to a communication network coupled to the plurality of stationary access points. In some implementations, the first communication system is configured to communicate with the at least one host device using a wireless communication network. In other implementations, the first communication system is configured to communicate with the at least one host device through at least one mobile forwarding device.

In yet further embodiments, the second communication system is configured to communicate with the plurality of stationary access points without address renegotiation of the second communication system. In even further embodiments, the second communication system is configured to couple to a communication network through a different respective one of the plurality of stationary access points as the mobile communication system moves. In one implementation, the second communication system is configured to select a current one of the plurality of stationary access points through which to couple to the communication network based, at least in part, on a signal strength of a communication signal between the second communication system and the plurality of stationary access points.

In a further embodiment, the mobile communication system is coupled to a vehicle. In one implementation, the vehicle includes at least one of a boat, a train, a bus, and a car, and the at least one host device includes at least one of a laptop computer, a personal digital assistant, and a cellular telephone.

Another aspect includes a method of authenticating a mobile device. In one embodiment, the method comprises receiving an authentication request from the mobile device at a first stationary access point; authenticating the mobile device to the first stationary access point by requesting authentication from an authentication server; storing authentication information identifying the mobile device in an authentication cache associated with the first stationary access point and at least one second stationary access point; receiving an authentication request from the mobile device at the at least one second stationary access point; and authenticating the mobile device to the second stationary access point by referencing the stored authentication information.

In some embodiments, authenticating the mobile device to the at least one second stationary access point takes less than about 2 milliseconds. Some embodiments further comprise grouping the first stationary access point and the at least one second stationary access point so that the stored information identifying the mobile device can be provided to each at least one second stationary access point in the group by referencing the stored authentication information and without requesting further authentication from the authentication server. In one implementation, grouping includes maintaining the authentication cache in a WLCCP controller and permitting authentication access to the WLCCP controller by each of the first stationary access point and each of the at least one second stationary access point.

Some embodiments of this aspect further comprise providing access to a communication network coupled to the first stationary access point and the at least one second stationary access point to the mobile device. In some implementations, providing access to the communication network includes maintaining forwarding information for the mobile device based on a data link layer address of the mobile device. One implementation further comprises forwarding information addressed to a network layer address of the mobile device to the mobile device based on the maintained forwarding information. In other implementations, providing access includes providing access without address renegotiation by the mobile device.

In some embodiments, requesting authentication from the authentication server includes requesting authentication from a RADIUS server. In other embodiments, the mobile device traverses a path proximate the first stationary access point and the at least one second stationary access point at an average rate of travel, and the act of storing the authentication information includes storing the authentication information for a period of time sufficient to allow the mobile device to traverse the path at the average rate of travel. In some implementations, authenticating the mobile device with the authentication server takes less than about 100 milliseconds.

Other embodiments further comprise providing access to a communication network coupled to the first stationary access point and the at least one second stationary access point to a plurality of host devices coupled to the mobile device. In some implementations, providing access to the communication network includes maintaining forwarding information corresponding to each respective host device of the plurality of host devices based on data link layer addresses of the respective host device. One implementation further comprises forwarding information addressed to a network layer address of a first host device of the plurality of host devices to the first host device based upon the maintained forwarding information corresponding to the first host device. In other implementations, providing access includes providing access without address renegotiation by the mobile device.

An even further aspect of the present invention includes a communication system for communicating with a mobile device. The communication system comprises a plurality of antenna systems, each respective antenna system of the plurality of antenna systems being configured to communicate with the mobile device when the mobile device is within a communication range of the respective antenna system, wherein the plurality of antenna systems are disposed at spaced apart positions along a path traversed by the moving vehicle so that the mobile device is within a communication range of at least one antenna system of the plurality of antenna systems as it traverses the path and a line of sight is maintained between the mobile device and the at least one antenna system of the plurality of antenna systems.

In some embodiments, the mobile device is a mobile access point configured to provide network access to a plurality of host devices by communicating with the at least one antenna system of the plurality of antenna systems. In other embodiments, the plurality of host devices includes at least one of a laptop computer, a personal digital assistant (PDA), and a cellular telephone. In still other embodiments, the mobile access point is configured to provide network access to the plurality of host devices by communicating with the at least one antenna system of the plurality of antenna systems through a wireless communication network. In some implementations, the wireless communication network includes a wireless network using an IEEE 802.11 communication protocol.

In further embodiments, a subset of the plurality of antenna systems is configured as an antenna group that includes an antenna group controller to facilitate low latency movement of the mobile device from communication with a first antenna system of the subset of antenna systems to communication with a second antenna system of the subset of antenna systems. In some implementations, the subset of antenna systems is arranged along an external portion of a curve in the path. In other implementations, the antenna group controller facilitates movement of the mobile device from communication with the first antenna system of the subset of antenna systems to communication with the second antenna system of the subset of antenna systems by authenticating the mobile device to the second antenna system. In one implementation, the antenna group controller includes at least one WLCCP controller. In another implementation, the antenna group controller includes an authentication cache, and authenticating the mobile device to the second antenna system includes querying the authentication cache.

In still further embodiments, the plurality of antenna systems are disposed at spaced apart positions along the path traversed by the moving vehicle so that the mobile device is within the communication range of at least two antenna systems of the plurality of antenna systems as it traverses the path and a line of sight is maintained between the mobile device and the at least two antenna systems of the plurality of antenna systems.

Another aspect of the present invention includes a communication system for communicating with at least one mobile device, comprising: a plurality of antenna systems, each respective antenna system of the plurality of antenna systems being configured to communicate with the mobile device when the mobile device is within a communication range of the respective antenna system, wherein the plurality of antenna systems are disposed at spaced apart positions along a path traversed by the mobile device and positioned relative to one another so that when a first antenna system of the plurality of antenna systems that is closest to the mobile device cannot communicate with the mobile device, the mobile device can communicate with at least one working second antenna system of the plurality of antenna systems that is disposed adjacent to the first antenna system.

In some embodiments, the communication range of the first antenna system overlaps with the communication range of the at least one working second antenna system. In other embodiments, the at least one working second antenna system includes a plurality of working second antenna systems.

In some implementations, the communication range of each of the plurality of working second antenna systems includes a communication range overlap in which the communication range of a first of the plurality of working second antenna systems overlaps the communication range of a second of the plurality of working second antenna systems. In this implementation, the communication overlap includes an area in which the mobile device may complete a connection process to each of the plurality of working second antenna systems. In one implementation, the connection process includes an authentication process.

Another aspect includes a mobile access point configured to provide access to a communication network to a plurality of host devices, wherein the communication system is configured to determine a geographic location of the plurality of host devices based, at least partially, on a determination of a geographic location of the mobile access point.

In some embodiments, the determination of the geographic location of the mobile access point is based on the location of a global positioning device coupled to the mobile access point. In some implementations, the mobile access point is configured to provide access to the communication network by communicating with at least a subset of a plurality of stationary access points coupled to the communication network. In other implementations, the subset of the plurality of stationary network access points changes as the mobile access point moves relative to the plurality of stationary access points.

In other embodiments, the determination of the geographic location of the mobile access point is based, at least partially, on the known geographic location of the subset of the plurality of stationary access points communicating with the mobile access point. In some implementations, the determination of the geographic location of the mobile access point is based, at least partially, on at least one characteristic of at least one wireless communication signal between the subset of the plurality of stationary access points and the mobile access point. In one implementation, the at least one characteristic of the at least one wireless communication signal is a signal strength. In another implementation, the signal strength includes a signal strength of at least one wireless network used by the mobile access point to communicate with the plurality of stationary access points.

In some embodiments, information is delivered to the plurality of host devices based on the determined geographic location of the plurality of host devices. In some implementations, the plurality of host devices includes at least one of a laptop computer, a personal digital assistant (PDA), or a cellular telephone.

Further features and advantages of the present invention as well as the structure and operation of various embodiments of the present invention are described in detail below with reference to the accompanying drawings. In the drawings, like reference numerals indicate functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
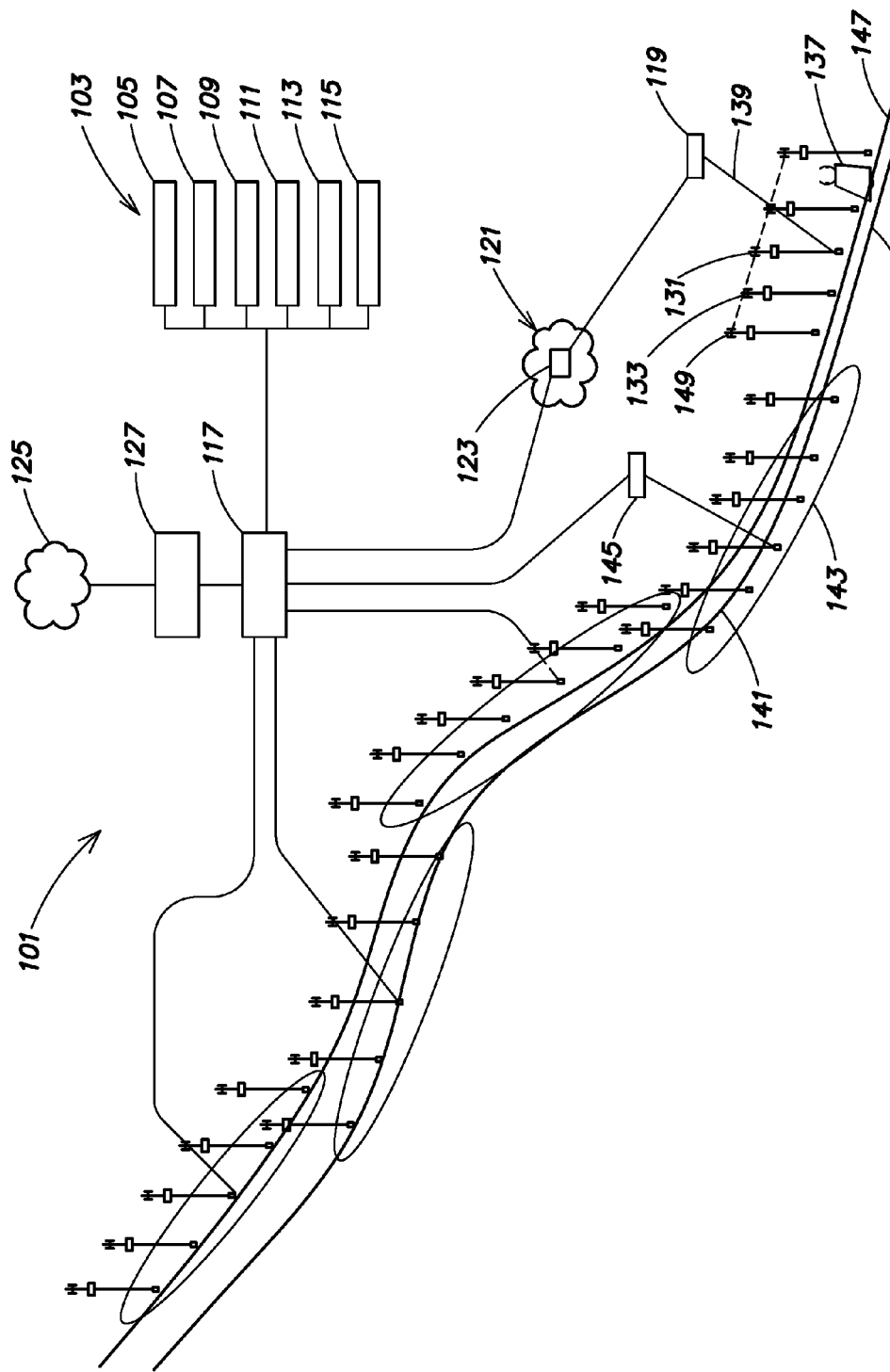
FIG. 1A illustrates an example communication network coupled to a plurality of stationary access points consistent with principles of the present invention.

Various aspects of the invention are not limited in their application to the details of construction and the arrangement of components set forth in the following description or illustrated in the drawings. Aspects of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The present invention relates generally to providing network access to mobile devices. Some aspects of the invention relate to mobile devices traveling with a vehicle, such as a train, a bus, a boat, etc., along or adjacent to a relatively fixed path. Network access may be provided to the mobile devices through a plurality of stationary access points that are arranged along or adjacent to the path.

In one aspect of the present invention, one of the mobile devices may include a mobile access point. The mobile access point may be used to couple one or more other mobile devices to the network. In another aspect of the present invention, the mobile access point may record authentication information of the one or more other mobile devices so that a relatively fast transition can be achieved among stationary access points as the vehicle and thereby the mobile devices move along the path, as described in more detail below.

In effect, the combination of various aspects of the present invention may result in one moving network, which comprises the mobile access point and one or more other mobile devices such as mobile host devices and/or mobile forwarding devices, and one stationary network, which comprises the stationary access points and other elements, such as servers, forwarding devices, etc. The moving network may move relative to the stationary network and may couple to the stationary network to gain access to resources of the stationary network. Such coupling may result in the mobile devices coupled to the moving network having access to the stationary network without experiencing serious, if any, delays or renegotiating network addresses.

In accordance with one aspect of the present invention, one or more servers 103 may be coupled to a communication network 101, as illustrated in FIG. 1A. The plurality of servers 103 may provide one or more network services to devices coupled to communication network 101. The plurality of servers 103 may include an authentication server 105, a registration server 107, a dynamic host configuration protocol (DHCP) server 109, a structured query language (SQL) server 111, a network maintenance and/or monitoring server 113, a content server 115, and any other server configured to provide functionality to communication network 101 and/or devices coupled to communication network 101.

Any of the servers may be configured as a single device, such as a single general purpose computer, or a cluster of devices, such as plurality of blades. In some embodiments of the present invention, authentication server 105 may include a well-known remote authentication dial in user service (RADIUS) authentication server. According to one aspect of the present invention, it is appreciated that as any mobile device moves among networks or network access points, an authentication process may be performed by the new network or network access point. However, such an authentication may conventionally involve an unacceptable delay that may result in a loss of network access while the device awaits authentication.

To improve speed of authentication, which may cause interruptions in network access, in some embodiments of the present invention, authentication server 105 may limit responses to an authentication request to either a positive acknowledgement or a negative rejection of the authentication request. To further improve the speed of authentication, authentication server 105 may be configured to perform a limited specialized set of operations, for example, receive an authentication request from communication network 101, convert the data of the received request directly into a SQL query, execute the SQL query locally or through a networked SQL server 111, convert the result of the SQL query into an authentication response, and transmit the response through communication network 101. In accordance with one embodiment, authentication server 105 may be configured to respond to authentication requests at a speed sufficient to prevent an interruption of service as a mobile device moves between one stationary access point and another, as described in more detail below. The needed speed of authentication may vary based on the movement speed of the mobile device and any overlap in the communication regions of the relevant stationary access points, as is discussed below. In one implementation, authentication server 101 may be configured to respond to an authentication request in less than approximately 100 milliseconds.

A plurality of forwarding devices 117, 119 may also be coupled to communication network 101. The plurality of forwarding devices 117, 119 may include routers, switches, bridges, gateways, repeaters, access points, and any other device configured to receive data and forward data towards a destination of the data. Each forwarding device may be configured to direct data from a source towards a destination through communication network 101. Data directed from one location to another location through communication network 101 may pass through many such forwarding devices.

Each forwarding device may determine how to forward information to its intended destination. This determination may cause an unwanted delay in the transmission of the information to the destination. In some implementations of the present invention, forwarding devices 117, 119 may be configured to forward data using a well-known forwarding technique based on a network layer (e.g., layer 3 of the open systems interconnection (OSI) model) whereby the direction of data may be determined by the network layer address (e.g., internet protocol (IP) address) of the destination. In other implementations of the present invention, forwarding devices 117, 119 may be configured to forward data based on the data link layer (e.g., layer 2 of the OSI model) whereby the direction of data may be determined by the data link layer address (e.g., media access control (MAC) address) of the destination. Use of data link layer forwarding techniques may improve forwarding speed compared with network layer forwarding techniques because data link layer forwarding techniques may not include a step of examining network layer destination information. Further, it is appreciated that if a geographically dispersed network is created in the same network layer, client addressing using network layer information does not change as clients change location within the network. Such stable network addressing reduces lost packets and the need to renegotiate addresses as a client moves.

Forwarding information based on data link layer information is often referred to as MAC-layer bridging or switching. Forwarding information based on network layer information is often referred to as routing. Any reference to forwarding or forwarding techniques includes directing data in any fashion, including, but not limited to, by data link and/or network layer information.

One data link layer forwarding technique that may be used by forwarding devices 117, 119 to forward data through communication network 101 is asynchronous transfer mode (ATM) switching. Use of ATM switching may provide a high speed method of forwarding information from one location of communication network 101 to another location. Forwarding devices 117, 119 configured to use ATM switching may establish virtual circuits among each other through which information may be directed. The virtual circuits may map a path through which data may travel, at least a portion of the way, from a source to a destination. A virtual circuit may be established for each destination coupled to communication network 101.

A plurality of end nodes, including the plurality of servers 103 and other devices, may be coupled to communication network 101 through forwarding devices 117, 119. One or more of the end nodes may be configured to communicate with the forwarding devices through a direct connection using the ATM data link protocol or some other data link protocol such as Ethernet. In some embodiments, a forwarding device may be configured to communicate with end nodes using non-ATM data link protocols and convert that communication to an ATM data link protocol for transmission through communication network 101.

In some embodiments, forwarding devices 117, 119 may be configured to support a well-known ATM local area network emulation (LANE) allowing devices to couple to communication network 101 as if they were part of a single local area network (e.g., a network connected on the same data link) even if they are geographically distant and actually connected to different local networks. ATM LANE may allow high speed forwarding techniques based on data link layer addresses to quickly direct data from one location of communication network 101 to another location of the communication network even where the locations are geographically distant from each other or separated from each other by an external communication network (e.g., the Internet). ATM LANE may also allow a forwarding of information over long distances by data link layer techniques, quality of service selections that improve performance of high priority or streaming traffic, traffic and network management based virtual circuits, and high bandwidth capabilities.

Figure 1B:
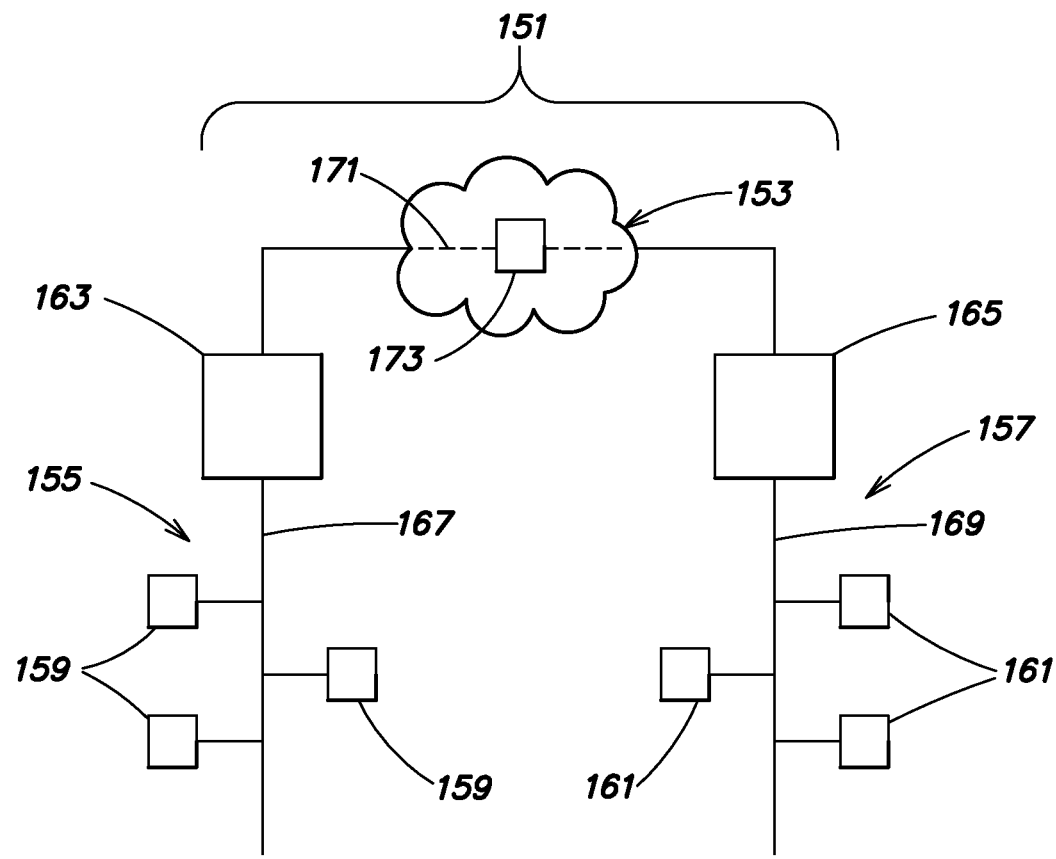
FIG. 1B illustrates a geographically wide network communicating as a local area network consistent with principles of the present invention.

FIG. 1B illustrates a communication network 151 spanning a large geographical area through a different communication network 153. Communication network 151 includes two physically separate network sections 155, 157 separated by a different communication network 153. Each network section 155,157 includes a plurality of host devices 159, 161 connected to a forwarding device 163, 165 through a data link 167, 169. The data links may be arranged to use any data link communication protocol that may be the same or different from each other or the protocol used to communicate through the different communication network 153, such as ATM, Ethernet, or Wi-Fi.

In standard network layer forwarding techniques, first network section 155 and second network section 157 generally act as separate local area networks requiring reauthentication, and additional forwarding steps to transmit data from one section to another. However, if network sections 155,157 are configured to operate using data link layer forwarding techniques such as ATM LANE, the two network sections may communicate as if they were part of the same local area network, as described above.

To configure a network such as the one illustrated in FIG. 1B to operate using ATM LANE, first forwarding device 163 may listen to first data link 167 for data being sent to devices coupled to second forwarding device 165 through second data link 169. When such data is transmitted on first data link 167, first forwarding device 163 may transparently forward data to second forwarding device 165 through an ATM virtual circuit 171 that traverses different network 153. Second forwarding device 165 may then transmit the data over the second data link 169 to the destination host device.

Forwarding devices 163, 165 may be configured to forward data based on the data link address of the destination, so each host device 159 on first network section 155 may transmit information to the host devices 161 of second network section 157 by identifying the data link address of the second host device as the destination address of the data. Because, according to one embodiment, forwarding may be performed using data link addresses and no change in network layer information occurs in a packet, devices can communicate with each other as if they were locally connected within a transparently bridged/switched network. Such a configuration can be used to combine network sections even when the network sections use different data link protocols by converting one protocol to another protocol transparently.

In some implementations, first forwarding device 163 and second forwarding device 165 may be connected through a third forwarding device 173 that may be part of a different communication network 153. For example, using ATM LANE, a virtual circuit 171 may be established through third forwarding device 173 so that third forwarding device 173 forwards information between first and second forwarding devices 163,165 based on data link layer destination addresses. The third forwarding device 173 may be part of a network of a large communication provider, such as a telephone or cable provider, enabling first forwarding device 163 to communicate over a long distance to second forwarding device 165 using existing communication channels (e.g., fibers, cables, switches, etc.) of the communication provider.

It should be recognized that embodiments of the invention are not limited to any particular arrangement and any particular configuration of forwarding devices, mobile devices, end nodes, or other network elements.

Referring back to FIG. 1A, in some embodiments, communication network 101 may also be coupled to an external network 125, such as the Internet. Devices coupled to communication network 101 may then access devices of external network 125. At least one edge forwarding device 127 may be configured as an edge router (e.g., a router that connects a local communication network to an external network) to couple communication network 101 to external network 125. Edge forwarding device 127 may convert received data between a communication protocol used by external network 125 and a communication protocol used by communication network 101 (e.g., ATM, Ethernet, Wi-Fi, etc.), if the communication protocols differ. The edge forwarding device may also provide security features to communication network 101 such as firewall protection.

Data received by edge forwarding device 127 and directed to a destination device coupled to communication network 101 may be directed through communication network 101 to the destination device. Similarly, edge forwarding device 127 may direct data transmitted from a source device coupled to communication network 101 to external network 125.

In accordance with another aspect of the present invention, a plurality of stationary access points 131, 133, and 149 may be coupled to communication network 101. A stationary access point may include a wired or wireless router, an antenna-based tower structure as described below, and/or any other device configured to provide access to communication network 101. In some embodiments, at least one first stationary access point 131 may be coupled directly to communication network 101 through a wired connection 139 to a forwarding device 117 coupled to communication network 101. The wired connection may include any type of mechanical connection such as fiber, cable, etc. Such a directly coupled first stationary access point 131 may be configured to act as a forwarding device of communication network 101 to couple other devices, including other stationary access points, to communication network 101. This configuration allows communication network 101 to be accessed wherever a stationary access point is located.

Various embodiments of the present invention may include at least one second stationary access point 133 that does not have a direct wired connection to communication network 101. Such second stationary access point 133 may couple to communication network 101 through the at least one first stationary access point 131 that does have a wired connection 139 to communication network 101. This configuration allows multiple stationary access points to couple to communication network 101 without requiring installation of direct wired connections to communication network 101 at each stationary access point. This coupling may be facilitated through wired or wireless connections between stationary access points.

Each such second stationary access point 133 that is coupled to communication network 101 through such a first stationary access point 131 may also then act as a forwarding device of communication network 101 to couple other devices, including other stationary access points, to communication network 101.

A network backbone (not designated) may be comprised by stationary access points 131, 133, 149 and any other forwarding devices 117, 119, 123, 127 and connections 139 used to forward data among the stationary access points 131, 133, 149, the servers 103, and the external network 125. In some embodiments of the present invention, each device of the network backbone, including stationary access points 131, 133, may be configured to use the ATM data link protocol and to forward data using ATM, as described above. In some implementations, the network backbone may include a distributed network backbone (i.e., one having a plurality of main forwarding devices directing data among the stationary access points, servers, and other devices coupled to communication network 101). In other implementations, the network backbone may include a collapsed backbone (i.e., one having a single main router 117 configured to direct data among the stationary access points, servers, and other devices coupled to communication network 101). Use of a collapsed backbone may simplify forwarding decisions by concentrating the decisions into a central main router. By contrast, use of a distributed backbone may provide a more reliable network that can accommodate one or more router failures without a complete network failure.

In accordance with another aspect of the present invention, each stationary access point 131, 133 may be configured to couple at least one mobile device 137 to communication network 101.

Mobile device 137 may include a mobile access point, another type of mobile forwarding device, or a mobile host device such as a laptop, PDA, or cell phone. In some embodiments, coupling to communication network 101 may be performed through a wireless connection between at least one stationary access point 131, 133 and mobile device 137. The stationary access points may allow access to communication network 101 for mobile devices (e.g., 137) that are within communication range.

In some embodiments, before fully coupling mobile device 137 to communication network 101, stationary access points 131, 133 may be configured to authenticate mobile device 137 with authentication server 105. After authenticating mobile device 137, the stationary access points 131, 133 may be configured to couple mobile device 137 to communication network 101 (e.g., allow communication between mobile device 137 and communication network 101, which may include communication to external network 125).

To facilitate communication between mobile device 137 and communication network 101, stationary access points 131, 133 may act as forwarding devices configured to forward data directed to and/or from mobile device 137. Whenever a route to mobile device 137 changes (e.g., when mobile device 137 couples to communication network 101 through a new stationary access point 131, 133), the new stationary access point (e.g., 131, 133) may be configured to update the forwarding information of other forwarding devices 119, 117 and other stationary access points 131, 133 coupled to communication network 101 and any external forwarding devices 123 through which forwarding devices 117, 119 of communication network 101 communicate, by, for example, generating and transmitting or forwarding a topology change notification (TCN) to the devices, so that data may be properly directed to mobile device 137. TCNs are well known in the art of network communication.

Figure 2:
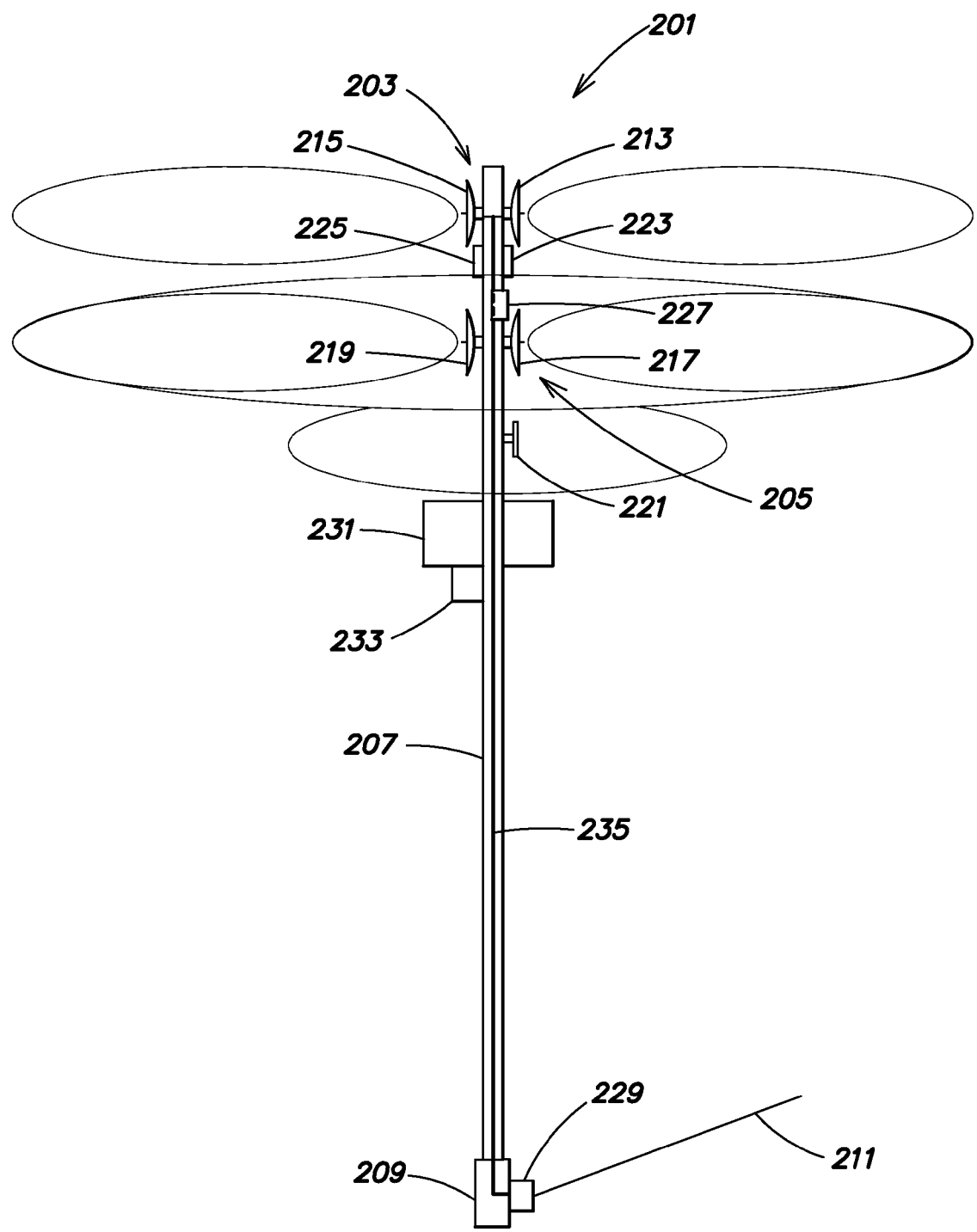
FIG. 2 illustrates a view of a first exemplary stationary access point consistent with principles of the present invention.

FIG. 2 illustrates an exemplary stationary access point 201 in accordance with another aspect of the present invention that may be used as one of the stationary access points 131, 133, 149 illustrated in FIG. 1A. In some embodiments, a stationary access point similar to that shown in FIG. 2 may be used as a primary access point to which a plurality of secondary access points may couple to the communication network 101, as described in more detail below. The exemplary stationary access point 201 comprises a support structure 207 to which a first communication system and a second communication system are mounted. In one embodiment, the first communication system includes a first antenna system 203, and the second communication system includes a second antenna system 205. Each antenna system may include one or more antennas and one or more radio devices. In other embodiments of a stationary access point, the first and second communication systems may include any other type of communication systems including wired or wireless communication systems configured to provide full or half duplex communication, such as optical communication systems or audio communication systems. The communication systems may be used by the stationary access point to communicate with other stationary access points and to provide access to communication network 101 to mobile devices.

The support structure 207 may include any type of support structure capable of adequately supporting the communication systems and may be made from any type of material including timber, fiberglass, metal, and concrete, or combinations thereof. The support structure 207 may be used to support other items such as advertisements (e.g., billboards), utility equipment (e.g., telephone poles), or structural elements (e.g., a bridge). Support structure 207 may be coupled to a footing 209 configured to uphold support structure 207 and any devices mounted to support structure 207 with the type and site of the footing being appropriate to the climate, environment, safety guidelines, etc. of the location in which it is used.

In one embodiment, stationary access point 201 also may include a wired connection 211 to communication network 101. Wired connection 211 to communication network 101 may be used to transmit data between stationary access point 201 and communication network 101. Wired connection 211 may include a T1 connection, an optical fiber, or any other wired connection configured to provide the desired bandwidth between communication network 101 and stationary access point 201 and couple to the at least one mobile device 137. Other embodiments of a stationary access point may alternatively include a wireless connection to communication network 101 or connect to communication network 101 through one of the other communication systems (e.g., 203). In yet a further embodiment, a stationary access point may include both a wired connection 211 and a wireless connection to communication network 101. In such an embodiment, the wireless connection could be used as a back-haul network connection to communication network 101, or for redundancy in the event that communication via the wired connection is disrupted. Whatever connection method is used, a connection to communication network 101 may allow stationary access point 201 and any devices communicating with the stationary access point to couple to communication network 101 with data transfer rates sufficient to satisfy the desires of a user of the mobile device 137. Typical sufficient data transfer rates to mobile device 137 may range from approximately a few kilobytes per second to approximately many megabytes per second depending on the needs of the mobile device user.

In one embodiment, first antenna system 203 comprises two antennas 213, 215 configured to wirelessly communicate with one or more directly or indirectly neighboring stationary access points. First antenna system 203 may be used to couple the one or more neighboring stationary access points to communication network 101 through first stationary access point 201. Such coupling can be accomplished by forwarding data directed to communication network 101 through wired connection 211 and forwarding data directed to the one or more neighboring stationary access points to the first antenna system 203. A first antenna 213 of first antenna system 203 may include a parabolic antenna, such as a 2.4 or 5.8 GHz AIRONET solid dish antenna commercially available from the Cisco Corporation, San Jose, Calif., having a main lobe oriented in a first direction and primarily propagating radio frequency (RF) energy toward a first set of neighboring stationary access points. Second antenna 215 of first antenna system 203 may include a parabolic antenna, such as a 2.4 or 5.8 GHz AIRONET solid dish antenna commercially available from the Cisco Corporation, San Jose, Calif., having a main lobe oriented in a second direction and propagating RF energy primarily in the second direction, different than the first direction, toward a second set of neighboring stationary access points. It should be appreciated that any antenna type including parabolic, omnidirictional, leaky coaxial cable, or any other antenna type capable of radiating RF energy may be used for any antenna system of the present invention.

First exemplary stationary access point 201 may selectively forward data to the first set of neighboring stationary access points or the second set of neighboring stationary access points by sending the data through the respective antenna 213 or 215. Each antenna 213 and 215 of first antenna system 203 may be configured to communicate on the same or different radio frequencies using the same or different communication protocols. For example, the first antenna may be configured to communicate using channel 5 of the 802.11g communication protocol (i.e., 2434 MHz) and the second antenna may be configured to communicate using channel 10 of the 802.11g communication protocol (i.e., 2457 MHz). By using such different frequencies, interference, which may occur when neighboring antennas communicate on the same frequency, may be reduced.

Second antenna system 205 may comprise three antennas 217, 219, 221 configured to communicate with at least one mobile device 137. Exemplary stationary access point 201 may forward data destined to the at least one mobile device 137 by transmitting the data through second antenna system 205. A first antenna 217 of second antenna system 205 may include a first parabolic antenna, such as a 2.4 or 5.8 GHz AIRONET solid dish antenna commercially available from the Cisco Corporation, San Jose, Calif., propagating RF energy primarily in a first direction along a path 129 along which at least one mobile device 137 moves. A second antenna 219 of second antenna system 205 may also include a second parabolic antenna, such as a 2.4 or 5.8 GHz AIRONET solid dish antenna commercially available from the Cisco Corporation, San Jose, Calif., propagating RF energy primarily in a second direction along path 129 along which at least one mobile device 137 moves. Although the first and second directions will generally be substantially opposite to one another, it should be appreciated that they will depend upon the direction of the path along which the at least one mobile device 137 moves.

First antenna 217 of second antenna system 205 may communicate with the at least one mobile device 137 when the at least one mobile device 137 is traveling in the second direction toward stationary access point 201 or traveling in the first direction away from the stationary access point 201 and is within a communication range of first antenna 217. Second antenna 219 may communicate with the at least one mobile device 137 when the at least one mobile device 137 is traveling in the first direction towards the stationary access point 201 or traveling in the second direction away from stationary access point 201 and is within a communication range of second antenna 219.

In the illustrated embodiment, each of the first and second antennas 217, 219 of second antenna system 205 propagate RF energy primarily away from the first exemplary stationary access point and are disposed at a height greater than a height of mobile device 137. This configuration may leave an area near the support structure with a low level of signal from either the first of second antenna systems. The communication range of each of first and second antennas 217, 219 may cover an area from a minimum distance from exemplary stationary access point 201 to a maximum distance from exemplary stationary access point 201 so that the data transfer rate between the antenna system and the mobile device 137 is at least a minimum level within the communication range, such as between approximately a few kilobytes per second and approximately many megabytes per second depending on the needs of the mobile device user.

A third antenna 221 of second antenna system 205 may include an omnidirectional antenna, such as an AIRONET omnidirectional mast antenna available commercially from the Cisco Corporation, San Jose, Calif., configured to communicate with mobile device 137 when mobile device 137 is within the communication range of third antenna 221. The communication range of third antenna 221 may cover the area that is between the minimum distances covered by first and second antennas 217, 219 of second antenna system 205. This configuration of antennas in second antenna system 205 may allow mobile device 137 to maintain communication with second antenna system 205 throughout the region between the exemplary stationary access point and the minimum distance of each of the first and second antennas 217, 219 of second antenna system 205. Thus, the communication range of the second antenna system 205 may cover the region extending between the maximum distance of antenna 217 and antenna 219, with no gap in coverage proximate to the stationary access point 201 itself. It should be appreciated that in other embodiments, the third antenna 221 may be other than an omnidirectional antenna. For example, to avoid propagating RF energy in all directions (and in particular, in directions other than toward the path 129 along which the at least one mobile device 137 moves), it may be desirable to use a more directional type of antenna that is capable of propagating RF energy toward the path 129, and having a beam pattern that encompasses the region between the minimum distances of antenna 217 and 219. A stationary access point configured in accordance with these embodiments of the present invention and in accordance with previously discussed aspects of the present invention may provide sufficient data transfer rates between the mobile device 137 and a communication network whenever the mobile device is within a communication range of one of a plurality of stationary access points that may be arranged across a large geographical area.

To facilitate communication among antenna systems 203, 205 and communication network 101, each antenna system may be connected together by a wired bus 235 that also connects to wired connection 211. When data is received by one antenna system, it may be transmitted to another antenna system or to wired connection 211 through wired bus 235. Similarly when data is received through wired connection 211, it may be forwarded to one or more of the antenna systems through wired bus 235.

First antenna system 203 may include first and second forwarding element 223, 225. Each of the forwarding elements 223, 225 may maintain forwarding information for a plurality of devices coupled to communication network 101, including mobile device 137 and any neighboring stationary access points. When data is received by first antenna 213 of first antenna system 203 (e.g., from the first set of neighboring stationary access points), first forwarding element 223 may forward the data to either second antenna 215 of first antenna system 203 to be transmitted to the second set of neighboring stationary access points, to second antenna system 205 to be transmitted to the at least one mobile device 137, or to wired connection 211 to be transmitted to communication network 101. Similarly, when data is received by second antenna 215 of first antenna system 203 (e.g., from the second set of neighboring stationary access points), second forwarding element 225 may forward the data to either first antenna 213 of first communication system 203 to be transmitted to the first set of neighboring stationary access points, to second antenna system 205 to be transmitted to the at least one mobile device 137, or to wired connection 211 to be transmitted to communication network 101. Decisions of where to forward the data may be made based on forwarding information maintained by forwarding elements 223, 225. Such forwarding information may include, for example, a well-known forwarding table. After making the forwarding decision, the data may then be transmitted through wired bus 235.

In one embodiment, second antenna system 205 may include a third forwarding element 227. Similar to first and second forwarding elements 223, 225 of first antenna system 203, third forwarding element 227 of second antenna system 205 maintains forwarding information for a plurality of devices coupled to communication network 101. When data is received by second antenna system 205, third forwarding element 227 forwards the data to first antenna system 203 for transmission to a neighboring stationary access point or to direct connection 211 for transmission to communication network 101. Decisions of where to forward data may be made based on forwarding information maintained by third forwarding element 227.

In some embodiments, the forwarding elements of the antenna systems 203, 205 may include the radio devices coupled to the antenna systems. For example, a radio device coupled to first antenna system 203 of the first communication system may provide input to first antenna 213 and forwarding functionality for incoming and outgoing information, as described above. In some implementations, an AIRONET wireless access point available commercially from the Cisco Corporation, San Jose, Calif., may be used as a radio device with such forwarding capabilities for the antenna systems.

A fourth forwarding element 229 may be coupled to wired connection 211. Similar to forwarding elements 223, 225, 227 of first and second antenna systems 203, 205, fourth forwarding element 229 may maintain forwarding information for a plurality of devices coupled to communication network 101. When data is received through wired connection 211, fourth forwarding element 229 forwards the data to first antenna system 203 for transmission to a neighboring stationary access point or to second antenna system 205 for transmission to mobile device 137. Decisions of where to forward data may be made based on forwarding information maintained by the fourth forwarding element.

In an alternative embodiment of a stationary access point, each communication system and the wired connection may be treated as a single communication system having only a single forwarding element. Any information received through any antenna may be transmitted to the single forwarding element. The single forwarding element may then determine where the received information should be directed based on maintained forwarding information. For example, the single forwarding element may forward the data to the first or second antenna of first antenna system 203 for transmission to a neighboring stationary access point, to second antenna system 205 for transmission to mobile device 137, or to wired connection 211 for transmission to communication network 101.

In accordance with one embodiment of the present invention, a solar power source 231 and battery 233 may be coupled to support structure 207 of the first exemplary stationary access point. The solar power source 231 may be configured to supply power to the stationary access point as needed by the devices coupled to the stationary access point 201, including first and second antenna system 203, 205. The battery 233 may be configured to store excess power generated by solar power source 231 to supply power to stationary access point 201 when the solar power source 231 is unable to supply sufficient power (e.g., at night or during inclement weather). Using a solar power source 231 allows disposing of stationary access points in locations where power lines are not readily available or may require great cost to install. In other embodiments, a wired connection to an external power supply may power a stationary access point. In still other embodiments, multiple power sources (e.g., solar, battery, wired, and wind) may be used.

Figure 3:
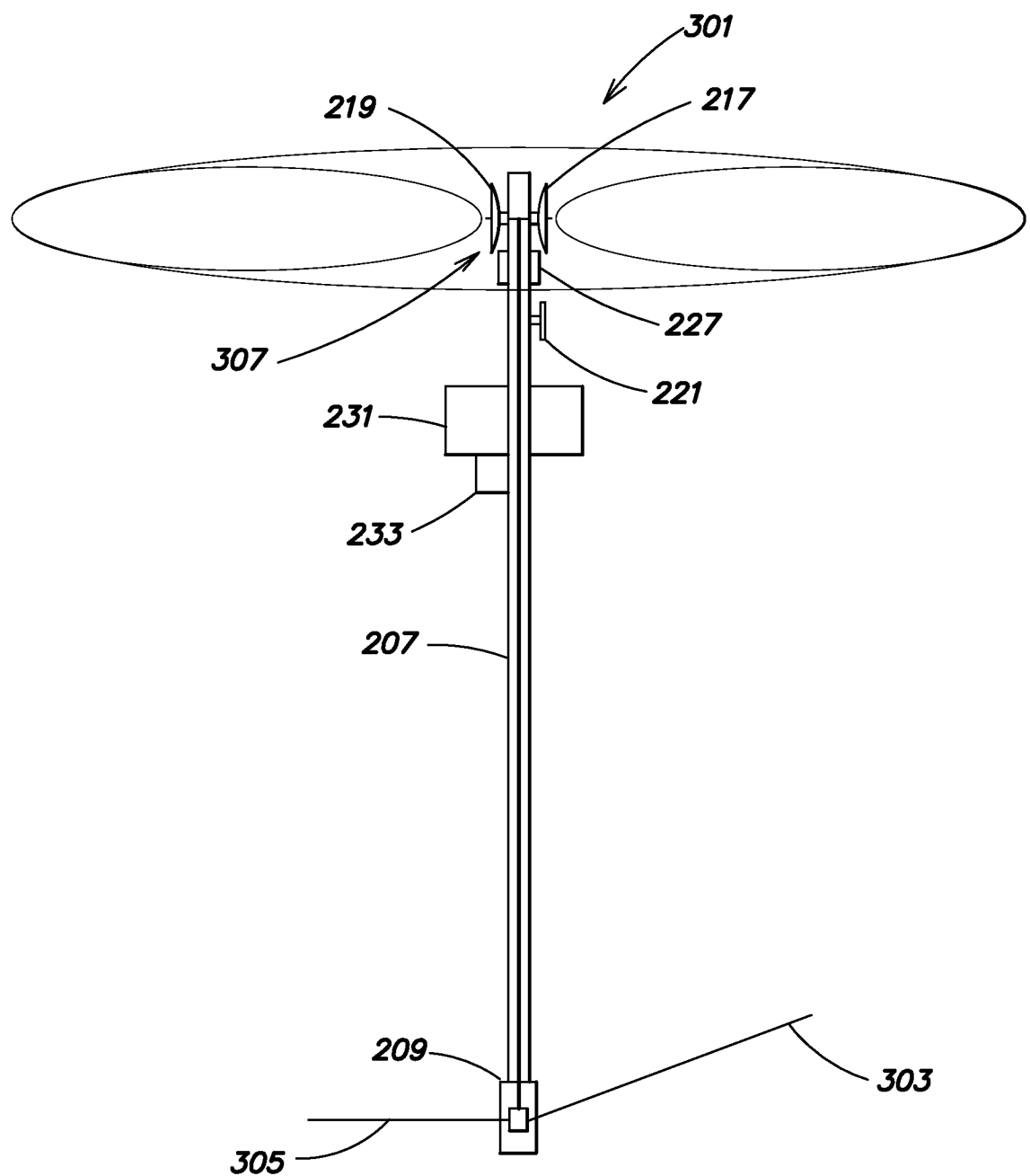
FIG. 3 illustrates a view of a second exemplary stationary access point consistent with principles of the present invention.

FIG. 3 illustrates another embodiment of a stationary access point 301 having wired connections 303, 305 to each of its neighboring stationary access points that may be used as one or more of the stationary access points disposed along or adjacent to the path of FIG. 1A. A first communication system is a first antenna system 307 of the second exemplary stationary access point 301. First antenna system 307 may be used to communicate with the at least one mobile device 137 and may be substantially similar to second antenna system 205 of previously described stationary access point 201. In other embodiments, the first communication system may include any other type of communication device including a wired or wireless communication device configured to provide full or half duplex communication. For example, the first communication system may include an optical or audio based communication device.

Unlike the previously described stationary access point 201, the stationary access point 301 of FIG. 3 does not include an antenna system configured to communicate with neighboring stationary access points. Rather, this embodiment of a stationary access point 301 may communicate with neighboring stationary access points by wired connection 303, 305 to the neighboring stationary access points. Such wired connections 303, 305 may increase the bandwidth of communication between neighboring stationary access points compared to neighboring stationary access points communicating using wireless connections. This increase in bandwidth may allow larger amounts of data to be transferred more quickly among the stationary access points and to mobile devices coupled to communication network 101 through such stationary access points. As described above, wired communication may be by any means including a mechanical connection, such as a fiber, wire, coaxial cable, etc.

In one embodiment, second exemplary stationary access point 301 may not include a wired connection directly to communication network 101. Instead, second exemplary stationary access point 301 may be coupled to communication network 101 through one of the neighboring stationary access points. Such a stationary access point that couples to the communication network 101 through a neighboring stationary access point may be referred to as a secondary stationary access point, and the access point through which the secondary stationary access point couples may be referred to as a primary stationary access point. Such a configuration reduces the number of direct connects to the communication network that are needed to expand the area covered by the plurality of stationary access points. New stationary access points can be added by simply connecting them to the existing stationary access points either by wired connections as in the embodiment of FIG. 3 or by wireless connections such as the ones described with respect to the first communication system of FIG. 2.

Figure 4:
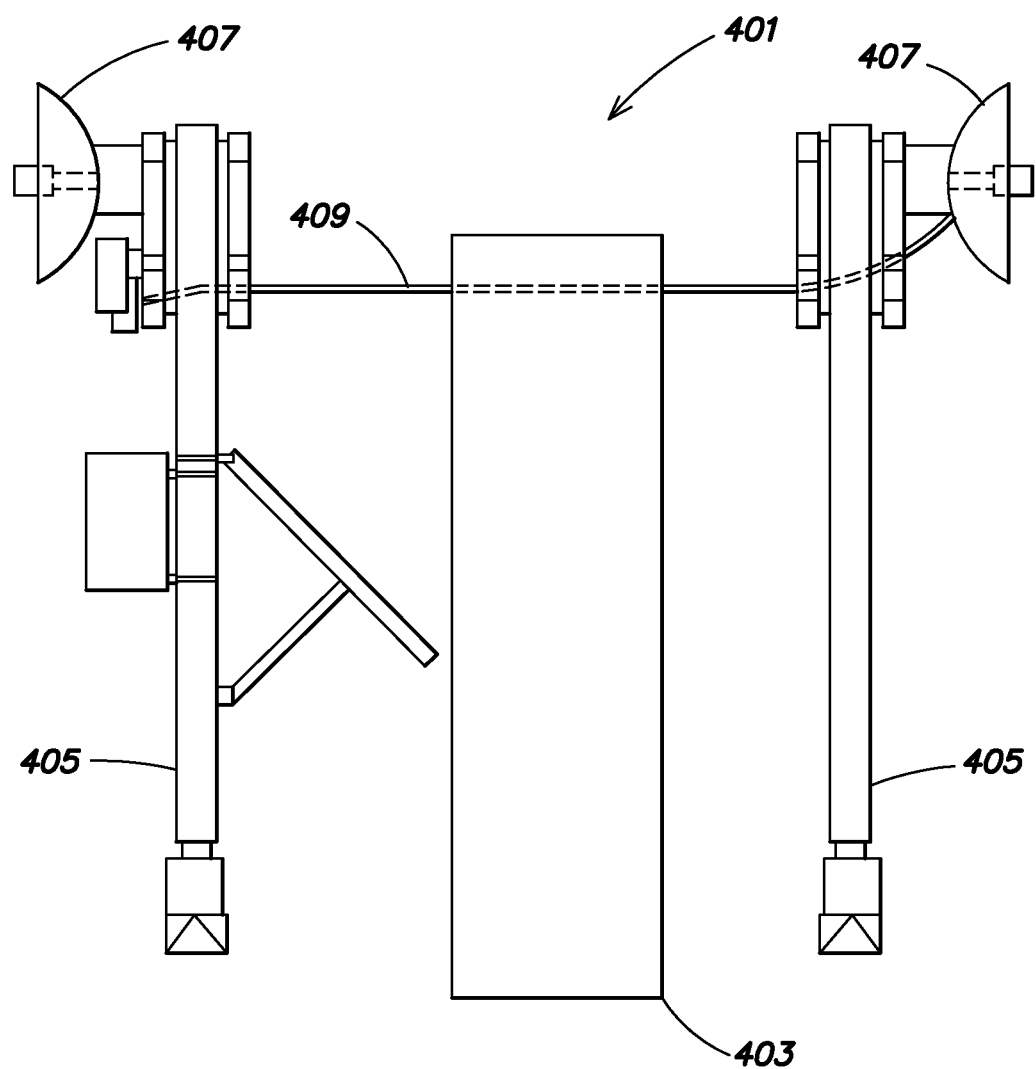
FIG. 4 illustrates a view of a third exemplary stationary access point consistent with principles of the present invention.

FIG. 4 illustrates yet another example of an arrangement of an exemplary stationary access point 401. As illustrated, in some embodiments, stationary access points may be positioned near an obstruction 403 that may obscure wireless transmission in one or more directions. Such an obstruction 403 may include, for example, a bridge, tunnel, or other geographic structure. As illustrated in FIG. 4, a stationary access point may be arranged to provide access to communication network 101 despite such an obstruction.

As illustrated, some embodiments of a stationary access point may include multiple supports 405 (e.g., two as shown in FIG. 4). One or more antenna systems 407 may be attached to each of the multiple supports 405. The supports 405 may be positioned on opposing sides of the one or more obstructions 403 and the antenna systems 407 may be arranged to face substantially away from the obstruction 403 to provide network access to mobile devices on respective sides of the obstruction 403. Between the supports 405, an intermediate antenna system 409 may be positioned to provide network access to mobile device there between. For example, in some implementations, the intermediate antenna system 409 may include a length of leaky coaxial cable disposed between the poles. The leaky coaxial cable may be connected to communication systems of one or more of the respective poles to provide a communication signal to mobile devices that are within range between the poles, such as traveling over a bridge, through a tunnel, or otherwise near the obstruction. In some implementations, leaky coaxial cable may include a coaxial cable with a relatively low attenuation per foot (e.g., Radix cable from the Andrew Corporation of Westchester, Ill.).

It should be recognized that the previously described example stationary access points are given as non-limiting examples only. In other embodiments any type or arrangement of stationary access point may be used. Such access points are not limited to any number or type of antennas or antennas systems.

Figure 5:
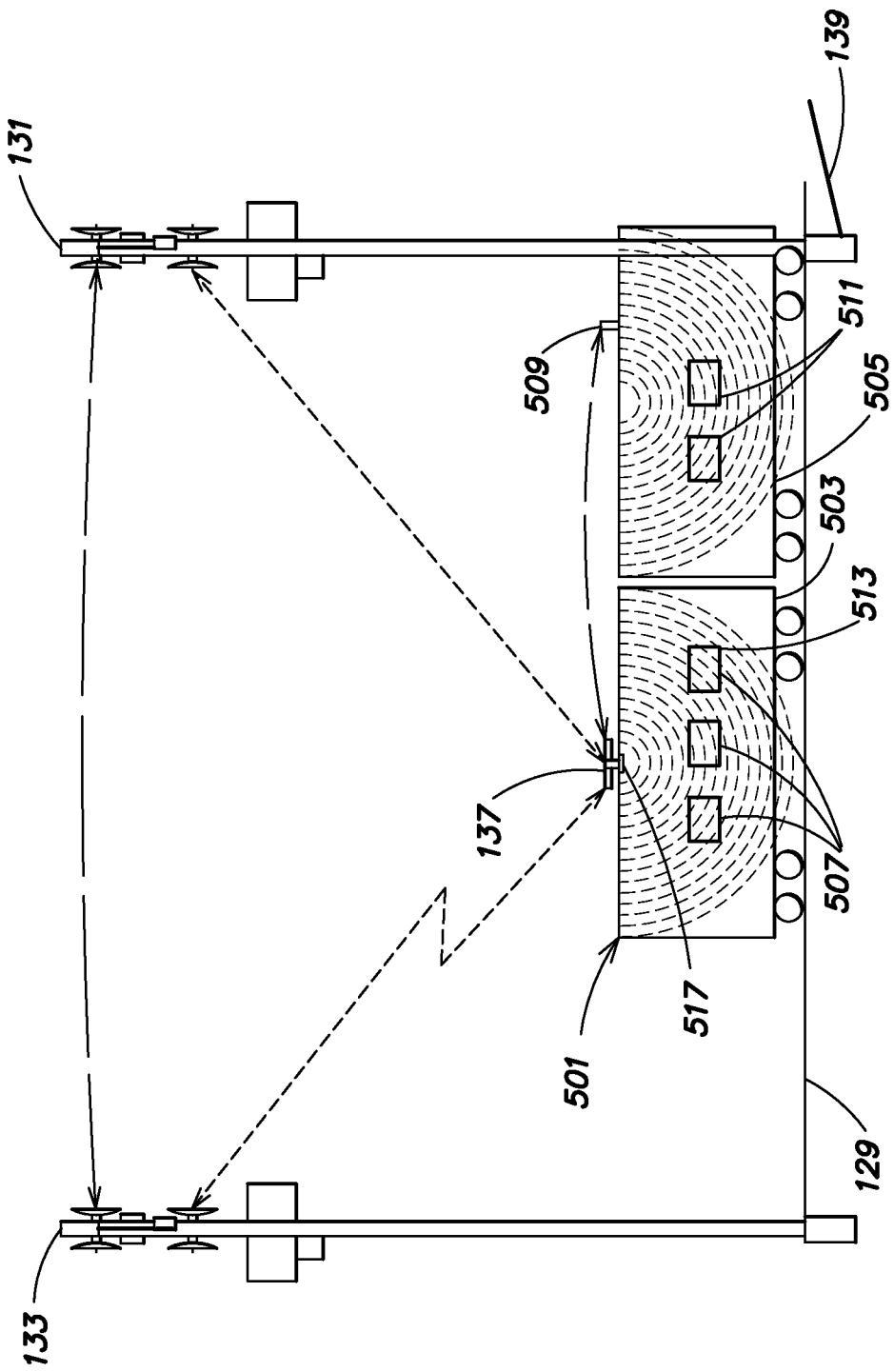
FIG. 5 illustrates a vehicle traveling near a plurality of stationary access points consistent with principles of the present invention.

According to various aspects of the present invention, the plurality of stationary access points 131, 133 may be disposed along or adjacent to path 129 traveled by a vehicle 501 as shown in FIG. 5 and FIG. 1A. In accordance with aspects of the present invention, vehicle 501 may include any vehicle capable of transporting the at least one mobile device 137 from one location to another. In various embodiments, vehicle 501 may be configured to transport a plurality of mobile devices (e.g., 137, 507, 509, 511, 513) and mobile device users along the path so that the plurality of mobile devices move relative to the stationary access points 131, 133. In the illustrated embodiment of FIG. 5, vehicle 501 includes a train that moves along fixed train tracks (i.e., the path 129). In other embodiments, a vehicle (e.g., 501) may include a boat traveling along a path (e.g., 129) of a water way (e.g., a shipping lane, ferry rout, etc.) or a bus or subway traveling along the path (e.g., 129) from one location to another. The mobile devices may include various computing devices such as cell phones, personal digital assistants, laptop computers, etc. that are used by passengers traveling aboard the vehicle, such as daily commuters on their way to and from work. The path 129 may include a fixed path or a nearly fixed path, such as a roadway, a track, a ferry route, or a shipping lane. The path may span a long distance of many kilometers.

In accordance with some embodiments, the path 129 may include a tunnel portion in which a supporting structure 207 is unavailable and/or difficult or costly to install. In such environments, a communication device capable of communicating with the mobile device may be attached to a portion of the tunnel wall or any other nearby existing structure (e.g., canyon wall). Such a communication device may include one or more parabolic antennas as described in the second antenna system of the first exemplary stationary access point above. A plurality of such communication devices may be wired together along the length of the tunnel portion or may communicate wirelessly through a second set of communication devices, such as the previously described first antenna system of the exemplary stationary access point illustrated in FIG. 2.

Alternatively, other embodiments may use at least one leaky coaxial cable in the tunnel portion as an antenna to couple the mobile device 137 to communication network 101 when the mobile device 137 is in the tunnel portion. For example, the leaky coaxial cable may be coupled to a tunnel forwarding device that is coupled to communication network 101. The tunnel forwarding device may broadcast data along and receive data from the leaky coaxial cable. The tunnel forwarding device may authenticate mobile device 137 with authentication server 105 when mobile device 137 first attempts to communicate with communication network 101 and act as a root device (i.e. a forwarding device that maintains, at least for a certain duration of time, authentication information of mobile device 137, as will be described in more detail below) to mobile device 137. The leaky coaxial cable may be arranged along or adjacent to a length of the tunnel section (e.g., attached to a tunnel wall or ceiling along the length of the tunnel). If necessary, multiple leaky coaxial segments may be used (e.g., in an extended tunnel such as the tunnel under the English Channel, etc.). Data may then be transmitted to mobile device 137 as energy radiating from the leaky coaxial cable along the length of the tunnel section after transmission from the tunnel forwarding device. Likewise, energy radiated by mobile device 137 may be received by the leaky coaxial cable and transmitted to the tunnel forwarding device. The leaky coaxial cable may be any coaxial cable having one or more portions of shielding removed along the length of the coaxial cable, such as a cable with a plurality of unshielded apertures, a cable with an unshielded slit, etc.

Figure 6B:
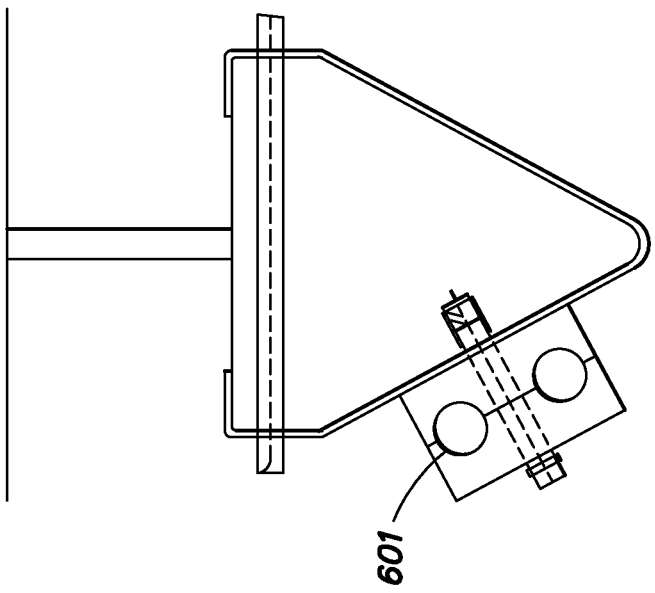
FIGS. 6A, and 6B illustrate example leaky coaxial cable hangers that may be used in some embodiments.
Figure 6A:
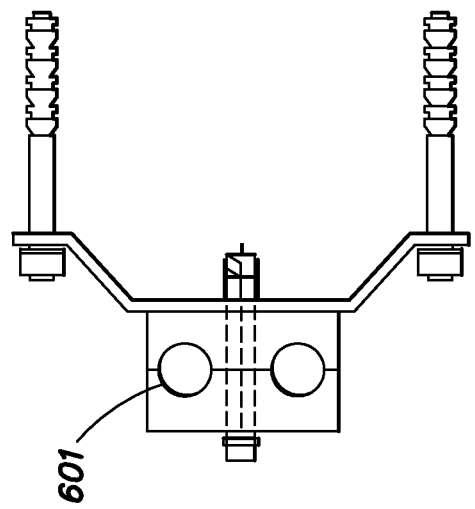

FIGS. 6A and 6B illustrate example leaky coaxial cable hangers that may be used in various embodiments to connect coaxial cable to a desired surface. The leaky coaxial cable hanger of FIG. 6A may be attached directly to a wall, ceiling, flooring, or other surface as desired. Similarly, the leaky coaxial cable hanger of FIG. 6B may also be hung from any surface as desired. The hanger of FIG. 6A may be used in situations where less clearance is available for a hanger, such as in a small tunnel. The cable may be disposed through cable hole 601 in either of the illustrated hangers.

Returning to refer to FIG. 5, various embodiments of the present invention may include multiple vehicles or a vehicle comprising a plurality of vehicle portions 503, 505. Each vehicle or vehicle portion may be configured to transport a plurality of mobile devices (e.g., 137, 507, 509, 511, 513) and users of mobile devices along path 129. For example, the train of FIG. 5 comprises a plurality of cars including a café car 503 and a passenger car 505. Various other embodiments may include a caravan of busses, cars, boats, or other vehicles.

In one aspect of the present invention, each stationary access point 131, 133 may be configured to allow wireless communication with the at least one mobile device 137 when mobile device 137 is in a communication range of the stationary access point. The stationary access points (e.g., 131, 133) may be arranged along the path 129 such that mobile device 137 is in the communication range of at least one stationary access point 131, 133 at all times as it travels from one end of path 129 to another end of path 129. Such a configuration allows a mobile device to travel the path and maintain communication with at least one stationary access point and communication network 101.

In some embodiments, the stationary access points may be configured in a primary-secondary configuration. For example, a primary pole, such as one illustrated in FIG. 2, may feed communication signals to a plurality of secondary poles. The primary and secondary poles in a respective group may be grouped together, for example, using a wired connection. The primary poles, however, may be connected through wireless communication. Other arrangements may be used.

For security purposes, first stationary access point 131 to which mobile device 137 attempts to connect may be configured to allow access to communication network 101 only after mobile device 137 has been authenticated. Mobile device 137 may request authentication when it enters a communication range of first stationary access point 131. First stationary access point 131 may authenticate mobile device 137 through authentication server 105 by transmitting an authentication request to authentication server 105 through communication network 101. When mobile device 137 moves from the communication range of first stationary access point 131 to the communication range of second stationary access point 133, mobile device 137 may request authentication with second stationary access point 133. Similar to the first stationary access point, the second stationary access point 133 may communicate with authentication server 105 to authenticate mobile device 137 before allowing mobile device 137 access to communication network 101. By requiring to authentication, the stationary access points 131, 133 prevent unwanted or untrusted devices from coupling to communication network 101.

Some embodiments of the present invention may not require authentication at all. For instance, some implementations may use wired equivalent privacy (WEP) encryption to prevent unwanted or untrusted devices from accessing communication network 101. In one such example, a WEP key may be shared with each trusted mobile device, and only the devices knowing the WEP key may then be allowed to couple to the communication network 101. It should be appreciated that various embodiments of the invention may use authentication or not, either alone or in connection with other methods, and the invention should not be limited to any particular type of authentication or combination of methods.

Once a mobile device 137 is authenticated to the second stationary access point 133, the second stationary access point may record the authentication information in an association table. The second stationary access point 133 may remove the recorded information after a set timeout period. While the information is in the association table, mobile device 137 may be allowed to couple to communication network 101 through the second stationary access point 133 without requiring reauthorization. In some embodiments, the association table may record authentication information of mobile device 137 based on a physical address of a communication device of mobile device 137 (i.e., the MAC address of a wireless adapter of the mobile device 137 may be recorded in an association table to indicate that the mobile device 137 is authenticated).

A stationary access point that records the authentication information of an authenticated mobile device 137, for at least a minimum time period, may, in the art, be called a root device. Conversely, a mobile device that was authenticated but does not record any authentication information and acts as a client of the root device may be called a non-root device. As described above, since stationary access points may have multiple communication devices, the root/non-root distinction may be applied at the communication device level. For example, the mobile device 137 may be only authorized to couple to the communication network 101 through a first communication device of a plurality of communication devices comprising a stationary access point (e.g., the second antenna system 205 of the first exemplary stationary access point 201). In that case, the first communication device may be a root device for the mobile device 137. In some cases, as discussed below, the mobile device may comprise a plurality of communication devices including a non-root to communication device to communicate with the root communication device of the stationary access point and root communication devices to communicate with non-root communication devices of other mobile devices.

Because root devices record the authentication information of other devices, the other devices may not need to be reauthenticated when they attempt to communicate with the root device after a first authentication. In some instances, the root devices may be configured to record the authentication information only for some predetermined period of time or timeout period when communication with the other devices is expected. In some implementations, the predetermined period of time may be a number of days such that a user of a mobile device that travels the path regularly needs to be reauthenticated only after an extended break in use, such as a vacation.

In some embodiments, authentication may delay mobile device 137 from coupling to communication network 101 because mobile device 137 may be denied access to communication network 101 until mobile device 137 is authenticated. If the first stationary access point 131 and the second stationary access point 133 are arranged such that their respective communication ranges do not overlap, mobile device 137 may be left without access to communication network 101 when it moves from the communication range of first stationary access point 131 to the communication range of second stationary access point 133 while second stationary access point 133 waits for authentication of mobile device 137.

In various embodiments of the present invention, the plurality of stationary access points may be arranged such that each stationary access point's communication range overlaps with the communication range of at least one other stationary access point so that the mobile device 137 does not experience access interruption as it moves between the first and second stationary access points 131, 133 of the plurality of stationary access points because of the authentication process. The overlap of communication ranges may be large enough so that authentication of the mobile device 137 by the second stationary access point 133 may be completed before the mobile device 137 moves out of the communication range of the first stationary access point 131. The overlap in communication range may vary based on the speed at which the mobile device is traveling and the time needed for performing the authentication process.

As vehicle 501 travels along path 129, line of sight may be maintained between mobile device 137 and a communication system of stationary access points (e.g., 131, 133) communicating with mobile device 137 to improve communication range. If the communication system includes an antenna system, obstruction of line of sight may diminish the reliability of services and the communication range of the stationary access points 131, 133. If the communication system includes an optical system, the obstruction of line of sight may completely end communication between mobile device 137 and stationary access points 131, 133. To maintain line of sight, the communication system of the stationary access point that is communicating with the mobile device 137 (e.g., the second antenna system of the first stationary access point) may be disposed at a sufficient height so that vehicle 501 does not obstruct the line of sight between the communication system and mobile device 137. In some implementations, the sufficient height may be at least as great as the tallest portion of the vehicle. In some implementations where the communication system includes an antenna system, the antenna system may be arranged such that less than approximately 40% of the radiation pattern of the antenna system is blocked by vehicle 501 as it travels along path 129.

To maintain line of sight as the vehicle 501 travels along a curve 141 of path 129, more stationary access points may be needed than to maintain line of sight along a straight portion 147 of path 129. This may be particularly true if the stationary access points are disposed along an inner portion of curve 141 so that they are passed quickly by vehicle 501 as it travels along curve 141. In one embodiment, to improve the line of sight of each stationary access point disposed along a curve (e.g., 141) in path 129, stationary access points may be disposed along or adjacent to the outer portion of curve 141. Disposing stationary access points along or adjacent the outer portion of the curve 141 may ensure that as the vehicle 501 traverses the curve 141, it is within communication range of at least one other stationary access point.

Furthermore, if vehicle 501 is moving quickly along curve 141, mobile device 137 may quickly move from the communication range of the first stationary access point 131 to the communication range of the second stationary access point 133. The time needed to authenticate mobile device 137 may be longer than the time in which the mobile device is within the overlapping communication ranges of the first and second stationary access points thereby potentially causing a break in network access.

To facilitate faster authentication times, according to one embodiment, the first and second stationary access points 131, 133 and any other stationary access points along curve 141 may be combined into one or more stationary access point groups 143, as shown in FIG. 1A. The stationary access point group 143 may be coupled to a stationary access point group controller 145. According to one embodiment, group controller 145 may be configured to provide a local authentication cache that stores authentication information requested and received by any stationary access point in stationary access point group 143. The local authentication cache may remove this information after a timeout period has passed, which may depend, for example, on the amount of memory in the cache. Authentication by one of the stationary access points of stationary access point group 143 then may only involve authentication server 105 if the authentication cache does not contain the requested authentication information. Once authenticated, as the vehicle 501 moves within the communication range of other stationary access points that are members of the group 143, the mobile device 137 may be authenticated by reference to the cached information, thereby eliminating the need to authenticate with the server 105. In accordance with one embodiment, the amount of memory of the cache may be sufficient to permit the information to remain for several days, such that a commuter that uses the same transportation need not be re-authenticated unless he or she is away for an extended period of time (e.g., a vacation).

In one embodiment, group controller 145 may include a wireless LAN context communication protocol (WLCCP) controller coupled to each of the stationary access points in the stationary access point group 143. In some implementations, the WLCCP controller may include a AIRONET access point, available commercially from the Cisco Corporation, San Jose, Calif., coupled to the stationary access points of the group. The group controller 145 may facilitate low latency authentication of the mobile device 137. Authentication may be provided to the stationary access points of the stationary access point group 143 in less than approximately two milliseconds if the requested authentication information is cached.

It should be appreciated that stationary access points may fail over time, leaving gaps of coverage along the path 129, which may also cause breaks in network access for the mobile device. To help prevent such gaps in coverage, in some embodiments of the present invention, the plurality of stationary access points may be arranged along path 129 so that coverage along path 129 is redundant. For example, first stationary access point 131, second stationary access point 133, and a third stationary access point 149 may be arranged so that the first and third stationary access 131, 149 points have a combined communication range that covers the communication range of the second stationary access point 133 and a sufficient overlap so that authentication by the third stationary access point 149 may complete before mobile device 137 leaves the communication range of the first stationary access point 131.

In such an arrangement, the second stationary access point 133 may fail without leaving a gap in coverage between the first and third stationary access points 131, 149. Therefore, even if the second stationary access point 133 is the closest stationary access point to mobile device 137, there may be no interruption in access to communication network 101 as mobile device 137 moves from the communication range of first stationary access point 131 to the communication range of third stationary access point 149, even if secondary stationary access point 133 is not operating or if communication between the mobile device 137 and the secondary stationary access point 133 is otherwise disrupted.

In one embodiment, mobile device 137 may be configured to change the stationary access point through which mobile device 137 couples to communication network 101 as vehicle 501 travels path 129. When mobile device 137 is in communication range of a plurality of stationary access points, mobile device 137 may be configured to couple to communication network 101 through the stationary access point providing the strongest or one of the stronger communication signal strengths at a current location of the of mobile device 137. The signal strength may be measured by the well-known received signal strength indicator (RSSI).

To facilitate a quick transition of the mobile device from coupling to communication network 101 through first stationary access point 131 to coupling through second stationary access point 133, mobile device 137 may be configured to authenticate with the second stationary access point 133 while mobile device 137 is still coupled to communication network 101 through the first stationary access point 131 and prior to mobile device 137 being configured to couple to communication network 101 through second stationary access point 133. For example, mobile device 137 may be configured to authenticate with second stationary access point 133 when the signal strength of second stationary access point 133 is still less than the signal strength of first stationary access point 131.

In some implementations, mobile device 137 may be configured to authenticate with second stationary access point 133 relatively soon after mobile device 137 enters the communication range of second stationary access point 133. Specifically, the mobile device 137 may authenticate with the second stationary access point 133 when the signal strength of the second stationary access point 133 is approximately half the signal strength of the first stationary access point 131.

In one implementation, mobile device 137 may be configured to authenticate with secondary stationary access point 133 by wireless communication to secondary stationary access point 133. For example, mobile device 137 may transmit an authentication request to secondary stationary access point 133 using a wireless communication system, as described below. In one implementation, mobile device 137 may be configured to authenticate with secondary stationary access point 133 through wireless communication with first stationary access point 131. For example, mobile device 137 may transmit an authentication request for second stationary access point 133 to first stationary access point 131 using a wireless communication system, as described below. First stationary access point 131 may receive the authentication request and forward the request to second stationary access point 133 (e.g., through the backbone). Second stationary access point 133 may authenticate mobile device 137, as described above, and transmit an authentication response to mobile device 137 though first stationary access point 131.

In one embodiment, first stationary access point 131 may communicate an authentication request for second stationary access point 133 to second stationary access point 133 using a data link layer address of second stationary access point 133. In one embodiment, such communication may occur when first stationary access point 131 and second stationary access point 133 may be geographically distant or separated by one or more external communication networks or other network layer barriers (e.g., router). For example, the first and second stationary access point may communicate using ATM LANE such that they may communicate with one another using data link layer addresses even over network barriers and large distances, as described above.

While the authentication occurs and after the authentication finishes, the mobile device 137 may be configured to continue coupling to the communication network 101 through the first stationary access point 131. Mobile device 137 may be configured to stop coupling to the communication network 101 through the first stationary access point 131 and begin coupling to the communication network 101 through the second stationary access point 133 at one of the later of when the authentication completes, when the strength of the communication signal received by mobile device 137 from the second stationary access point 133 exceeds the strength of the communication signal received by the mobile device 137 from the first stationary access point 131, or both.

In one aspect of the present invention, the at least one mobile device 137 communicating with stationary access points may include a mobile access point (also referenced herein as 137) configured to couple a plurality of other mobile devices 507, 509, 511, 513 to the communication network 101 through the plurality of stationary access points. The mobile access point 137 may provide access to communication network 101 to each of the plurality of mobile devices 507, 509, 511, 513 as mobile access point 137 travels along the path near or adjacent to stationary access points 131 and 133, for example while on a vehicle (e.g., 501).

In some embodiments, the stationary access points may be configured to authenticate the mobile access point 137 before allowing it to couple the other mobile devices 507, 509, 511, 513 to the communication network. The authentication may be performed through communication with the authentication server 105 or group controllers as described above. In some implementations, the authentication may be based on a physical address (e.g., MAC address) of a communication system of the mobile access point 137. Such authentication based on physical addresses allows the mobile access point to authenticate without a user or administrator entering a password or other login information.

The mobile access point 137 may be configured to communicate with the plurality of stationary access points using any communication protocol. If the network backbone is configured to communicate using ATM, mobile access point 137 may be configured to communicate with the plurality of stationary access points using ATM as well. Such a configuration may allow data to be forwarded through the plurality of stationary access points to mobile access point 137 without conversion from one protocol to another or reference to the network layer destination address of the data.

In one embodiment, mobile access point 137 may be configured to couple a plurality of mobile host devices 507 traveling along with the mobile access point 137 to communication network 101. The plurality of host devices 507 may include laptop computers, mobile phones, PDAs, or any other computing device configured to communicate over a computer network, such as those used by passengers of a vehicle.

In one embodiment, mobile access point 137 may be configured to allow at least one host device of the plurality of host devices 507 to couple to the communication network 101 after the mobile access point 137 authenticates the one host device with the authentication server 105. When the one host device attempts to couple to communication network 101 through the mobile access point 137, a user of the one host device may be required to provide login information such as a username and password to complete authentication. After authentication, the mobile access point 137 may couple the one host device to communication network 101 through one of the stationary access points. In some embodiments of the present invention, mobile access point 137 may act as a root device for the one host device (i.e., the mobile access point may record the authentication information of the one host device). In such embodiments, when mobile access point 137 moves to couple itself and the one host device to the communication network 101 through a different stationary access point, only mobile access point 137 may be required to authenticate with the different stationary access point. Because mobile access point 137 records that one host device has already been authenticated, no reauthentication may be needed between the mobile access point and the plurality of host devices 507. Such a configuration reduces the amount of authentication requests sent to the authentication server 105 each time mobile access point 137 moves to couple to the communication network 101 through a new stationary access point thereby allowing faster authentication of mobile access point 137.

The plurality of host devices 507 coupled to the communication network 101 through the mobile access point 137 may request IP addresses from the DHCP server 109 and access devices coupled to the communication network 101 and resources of the communication network 101. Mobile access point 137 may be configured to transmit forwarding information to communication network 101 for each of the plurality of host devices 507 so that other devices coupled to the communication network 101 may communicate with the host devices 507. The forwarding information may include the IP address of each of the host devices 507 and/or the physical addresses of each of the host devices 507.

Each time the mobile access point 137 moves to couple the host devices 507 to the communication network 101 through a different stationary access point, forwarding information may be transmitted through the communication network 101 to update the forwarding information of the other devices, including the forwarding devices, stationary access points, and servers, coupled to the communication network 101. When the other devices receive the updated forwarding information they may record the updated forwarding information to facilitate proper forwarding of data to the host devices 507 in the future. The forwarding information may include an identification of the port on which information destined for the host devices 507 should be transmitted in order to reach the host devices. The identification of the port may include receipt of the updated forwarding information on the port. When the other devices receive information destined for one of the host devices, they can reference this updated forwarding information and transmit data to the proper port. By so maintaining the forwarding information each time the mobile access point 137 moves, the host devices 507 may move along the path 129 without the need to obtain a new address to receive data destined for the host devices 507.

Communication between the mobile access point 137 and the host devices 507 may occur using any communication protocol known to both host devices 507 and mobile access point 137. If the network backbone and mobile access point 137 are configured to communicate using ATM, the host devices 507 may be configured to communicate with the mobile access point 137 using ATM as well. Such a configuration may allow data to be forwarded through the communication network 101, the stationary access points, and the mobile access point 137 to the host devices 507 without conversion from one protocol to another or reference to a network layer destination address of the data. Many host devices 507, however, may not be configured to use an ATM connection. The mobile access point 137 may be configured to communicate with these host devices 507 using any other communication protocol, such as Ethernet or Wi-Fi. Communication between mobile access point 137 and host devices 507 may be wired, wireless or a combination of wired and wireless. It should be recognized that information may be transmitted from one device (e.g., forwarding device, mobile device, etc.) to another device using any number of formats and/or protocols. Accordingly, as used herein, the expression "a representation of at least a portion of data" received by a device should be understood to refer to the underlying data received by a device, regardless of the formatting or other protocol information associated with that data.

In one embodiment, the mobile access point 137 may not directly communicate with host devices 507. Instead, a repeater 517 may be connected to the mobile access point 137 and direct data between the mobile access point 137 and the host devices 507. Repeater 517 may then repeat the received information either through wired or wireless communication methods to host devices 507.

In some embodiments of the present invention, at least one mobile forwarding device 509 may couple to the communication network 101 through the mobile access point 137. Mobile forwarding device 509 may include a router, switch, bridge, and/or repeaters configured to allow other mobile forwarding devices and/or mobile host devices 511 to couple to the communication network 101 through the mobile access point 137. Mobile forwarding device 509 may be used to extend the range of the mobile access point 137.

Mobile forwarding device 509 may be configured to communicate with mobile access point 137, other mobile forwarding devices, and mobile host devices 511 using any communication protocol. If the network backbone and the mobile access point are configured to communicate using ATM, mobile forwarding device 509 may be configured to use ATM as well. Such a configuration may allow data to be forwarded through the stationary access points to the mobile access point 137 and then to mobile forwarding device 509 without conversion from one protocol to another or reference to a network layer destination address of the data to provide a higher speed forwarding of data to and from mobile forwarding device 509.

Before a mobile forwarding device (e.g., 509) couples to the communication network 101 though the mobile access point 137, the mobile access point 137 may first authenticate the mobile forwarding device based on a physical address of the mobile forwarding device 509. Each mobile forwarding device (e.g., 509) may be configured to authenticate other mobile forwarding devices and mobile host devices 511 before coupling the other mobile forwarding devices and mobile host device 511 to the communication network 101 through mobile access point 137.

Figure 7:
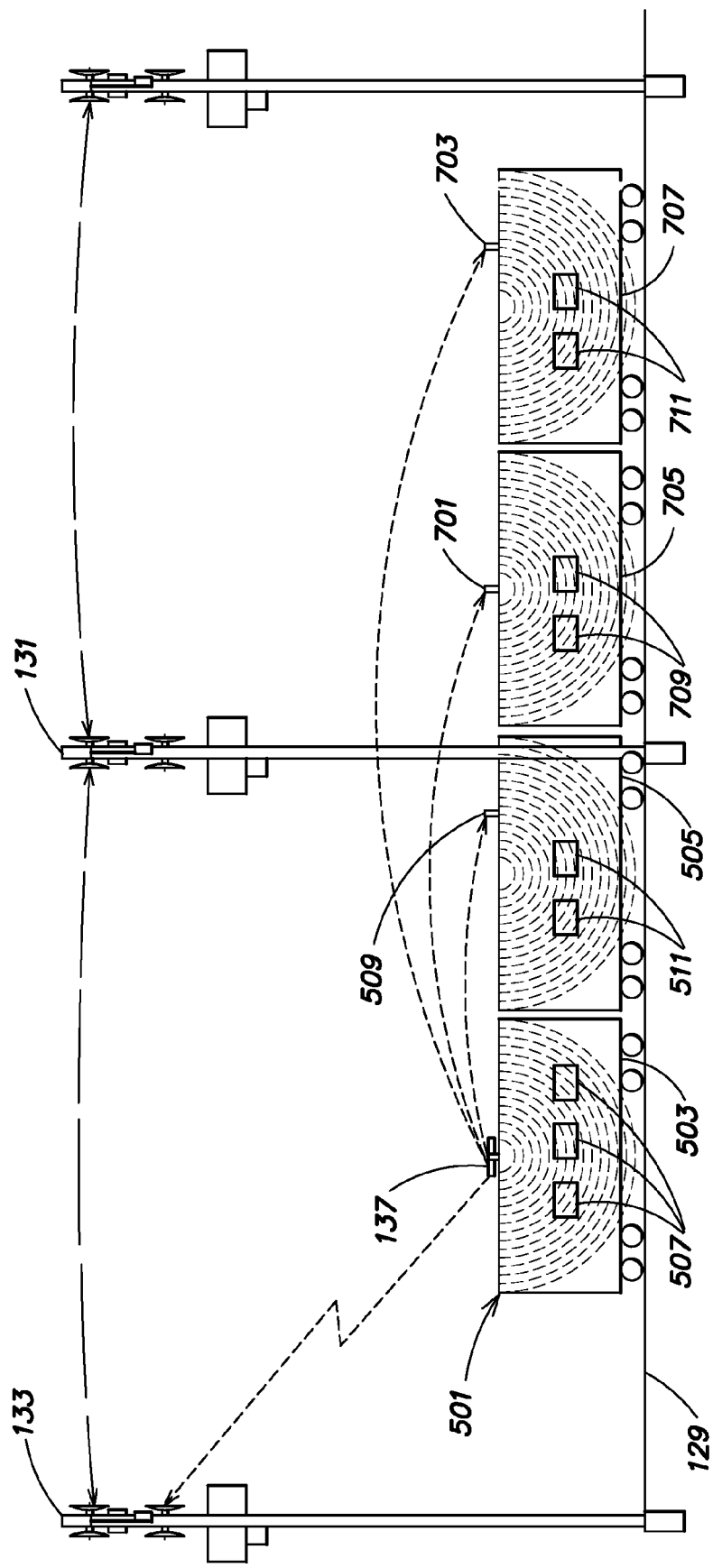
FIG. 7 illustrates a train traveling near a plurality of stationary access points consistent with principles of the present invention.

Mobile forwarding device 509 may be configured to act as a root device for other mobile forwarding devices, such as those shown coupled to other cars of the train depicted in FIG. 7. The mobile forwarding device 509 may also be configured to act as a root device to the mobile host devices 511 coupled to mobile access point 137 through the mobile forwarding device 509. In such an implementation, the mobile forwarding device 509 may maintain authentication information for these other mobile forwarding devices and mobile host devices 511 so that reauthentication of mobile forwarding devices and host devices may not be required as the mobile access point 137 moves to couple to the communication network 101 through a new stationary access point.

In one embodiment, mobile forwarding device 509 may include a repeater coupled to the passenger car 505 of vehicle 501 that communicates wirelessly with the mobile access point 137 coupled to the café car 503 of vehicle 501. Further, mobile forwarding device 509 may include a repeater to communicate with mobile host devices 511 within the passenger car. If the vehicle included other passenger cars, such as cars 705 and 707 of FIG. 7, another mobile forwarding device 701, 703 may be coupled to each car, as is shown in FIG. 7. Mobile forwarding devices 701, 703 couple host devices 709, 711 to the communication network 101. Mobile forwarding devices 701, 703 in passenger cars farther away from the mobile access point 137 may communicate with the mobile access point 137 through mobile forwarding devices (e.g., 509) closer to the mobile access point 137 or communicate directly with the mobile access point 137, as is illustrated in FIG. 7.

The mobile access point 137 may be configured with a plurality of communication systems similar to the communication systems of the stationary access point described above. The plurality of communication systems may include one or more wired communication systems. The plurality of communication systems may include one or more wireless communication systems configured to provide full or half duplex communication, such as optical or RF based communication systems. A first communication system may be configured to communicate with the plurality of stationary access points to couple the mobile access point 137 to the communication network 101. A second communication system of the mobile access point 137 may be configured to communicate with one or more host devices 507, 513 to couple the host devices 507, 513 to the communication network 101. A third communication system may be configured to communicate with one or more mobile forwarding devices (e.g., 509) to couple the mobile forwarding devices to the communication network 101. One or more of the communication systems of the mobile access point 137 may be an antenna system or other wireless communication system. The mobile access point 137 may include a forwarding system configured to forward data received by one communication system to another communication system to reach the destination of the data. The plurality of communication systems may be connected together with a wired connection. The forwarding of data may be performed based on maintained forwarding information.

Such a configuration allows the mobile access point to communicate with the stationary access points through one dedicated communication device, the host devices through another, and the repeaters through a third. Each communication device may communicate using the same or a different communication protocol on the same or a different channel If the devices each communicate using different frequencies, the entire bandwidth of each communication device may be available to communicate with the set of devices assigned to the communication device (e.g., the communication device used to communicate with the stationary access points may not reduce the bandwidth or interfere with the communication device used to communicate with the host devices).

The mobile forwarding device 509 may also include a plurality of communication systems. The plurality of communication systems may include one or more wired communication systems. A first communication system may be configured to communicate with the mobile access point 137. A second communication system may be configured to communicate with the mobile host devices 511. A third communication system may be configured to communicate with one or more other mobile forwarding devices. One or more of the communication systems of the mobile forwarding device 509 may be an antenna system or other wireless communication system configured to provide full or half duplex communication. The mobile forwarding device may include a forwarding system configured to forward data received by one communication device to another communication device to reach the destination of the data. The plurality of communication systems may be connected together with a wired connection. The forwarding of data may be performed based on maintained forwarding information.

It should be recognized that the above described configuration of mobile access points and mobile forwarding devices is given as an example only and that any other desired configuration may be used in other embodiments. For example, in some embodiments, no mobile forwarding device may be used, but rather, mobile devices may couple to mobile access points directly. In still other embodiments, each portion of a vehicle (e.g., car of a train) may include a separate mobile access point rather than a mobile forwarding device. Such an arrangement may be beneficial, for example, if distance between portions of a vehicle are too large and/or line of sight between portions of a vehicle are otherwise obstructed and are not sufficient for wireless transmission from a mobile forwarding device in one portion of the vehicle to a mobile access point in another portion of the vehicle (e.g., such as when going through tunnels, around curves, etc.).

In one aspect of the present invention, a monitoring server 113 may be coupled to the communication network 101. The monitoring server 113 may be configured to determine the geographic location of the vehicle 501, the mobile access point 137, or a mobile host device 511 coupled to the communication network 101 traveling along with the vehicle 501. In one embodiment of the present invention, to facilitate this determination, a global positioning device may be coupled to the mobile access point 137. The monitoring server 113 may receive information from the global positioning device identifying the position of the mobile access point 137. Since the mobile access point and host devices move along with the vehicle 501, the position of the mobile access point is indicative of the position of the vehicle 501 and the host devices.

In another embodiment of the present invention, the geographic position of each of the stationary access points may be known to the monitoring server 113 (e.g., they may be determined at the time of installation and input to the monitoring server 113). The monitoring server 113 may be configured to monitor which stationary access points are communicating with the mobile access point 137. In one implementation, each stationary access point may periodically transmit information to the monitoring server 113 indicating whether the stationary access point is communicating with the mobile access point 137. In other implementations, each stationary access point may be configured to notify the monitoring server 113 whenever the mobile access point 137 begins or stops communicating with the stationary access point. The monitoring server 113 may approximately determine the location of the mobile access point 137 based on the stationary access points with which the mobile access point 137 is communicating. For example, the monitoring server may approximate the location of the mobile access point 137 to be at the known location of the second stationary access point 133 when the mobile access point 137 is communicating with each of the first, second, and third mobile access points because the second stationary access point 133 is between the first and third stationary access points.

In some implementations, each stationary access point may also transmit information indicating the strength of a communication signal received from mobile access point 137 to the monitoring server 113. The monitoring server 113 may use this communication signal strength to improve the approximation of the location of mobile access point 137. The monitoring system may use known relationships between distance from a stationary access point and the strength of the communication signal to make these improved approximations. For example, the monitoring server may approximate the location of the mobile access point 137 to be closer to a known location of the first stationary access point 131 than to a known location of the second stationary access point 133 when the mobile access point 137 is communicating with the first stationary access point 131 with a stronger signal strength than with which it is communicating to the second stationary access point 133.

In some embodiments of the present invention, a content server 115 may deliver information to at least one host device (e.g., 507) coupled to the communication network based on the location of the mobile access point 137, mobile host device 511, or vehicle 501 determined by the monitoring server 113. The information may be directed to the mobile host device in the form of a web-based pop-up. The pop-up may, for example, indicate to a user of the mobile host device 511 that the vehicle 501 is near a certain location (e.g., a train station). The pop-up may be an advertisement for a business, museum, other tourist attraction, or special event near a current location of the mobile access point 137 and the mobile host device 511. The information may also be in the form of an email.

In some embodiments, the vehicle 501 may travel among relatively fixed locations at which passengers may load/unload the vehicle. For example, a train may travel among train stations, and a bus may travel among bus stops. Network access may be facilitated at the fixed locations through one or more antenna systems disposed at or near the fixed locations. For example, in some embodiments, one or more omnidirectional antennas which are coupled to network 101 may be positioned at or near the fixed location to provide access to network 101 to mobile devices at or near the fixed location. In some embodiments, one or more lengths of leaky coaxial cable which are coupled to network 101 may be positioned at or near the fixed location to provide access to network 101 to mobile devices at or near the fixed location.

One or more of the fixed locations may include a large area. In such situations, multiple antennas or lengths of leaky coaxial cable may be used to provide access to network 101. The multiple antennas or lengths of leaky coaxial may be positioned and arranged such that all or substantially all of the large area is provided with network access. In some embodiments, for example, in which the fixed location includes a large waiting room, as is typical in train stations, one or more lengths of leaky coaxial cable may be positioned on opposing sides of the large waiting room. The lengths of leaky coaxial cable may be configured to provide network access through different wireless channels (e.g., 5 channels of separation). By so positioning and arranging the lengths of leaky coaxial cable, line of sight issues and interference problems may be eliminated or minimized In some embodiments, one or more antenna systems (e.g., such as those illustrated in FIG. 2, 3, or 4, leaky coaxial cable, etc.) may be part of or connect to an existing or future system. For example, in some embodiments, leaky coaxial cable that may, for example, be used within a fixed location and/or a tunnel to provide network access, may be part of an existing leaky coaxial system. The existing leaky coaxial system may, for example, include an emergency communication system or other existing communication system. The antennas may also connect to a system, such as a separate communication system, and thereby be shared among multiple systems. For example, in one embodiment, the leaky coaxial may connect to a cellular system configured to provide cellular service within tunnels or at the fixed location or elsewhere.

Having described the structure of various components, operation of an exemplary embodiment of the present invention that is configured to use an ATM LANE is described below.

Figure 8:
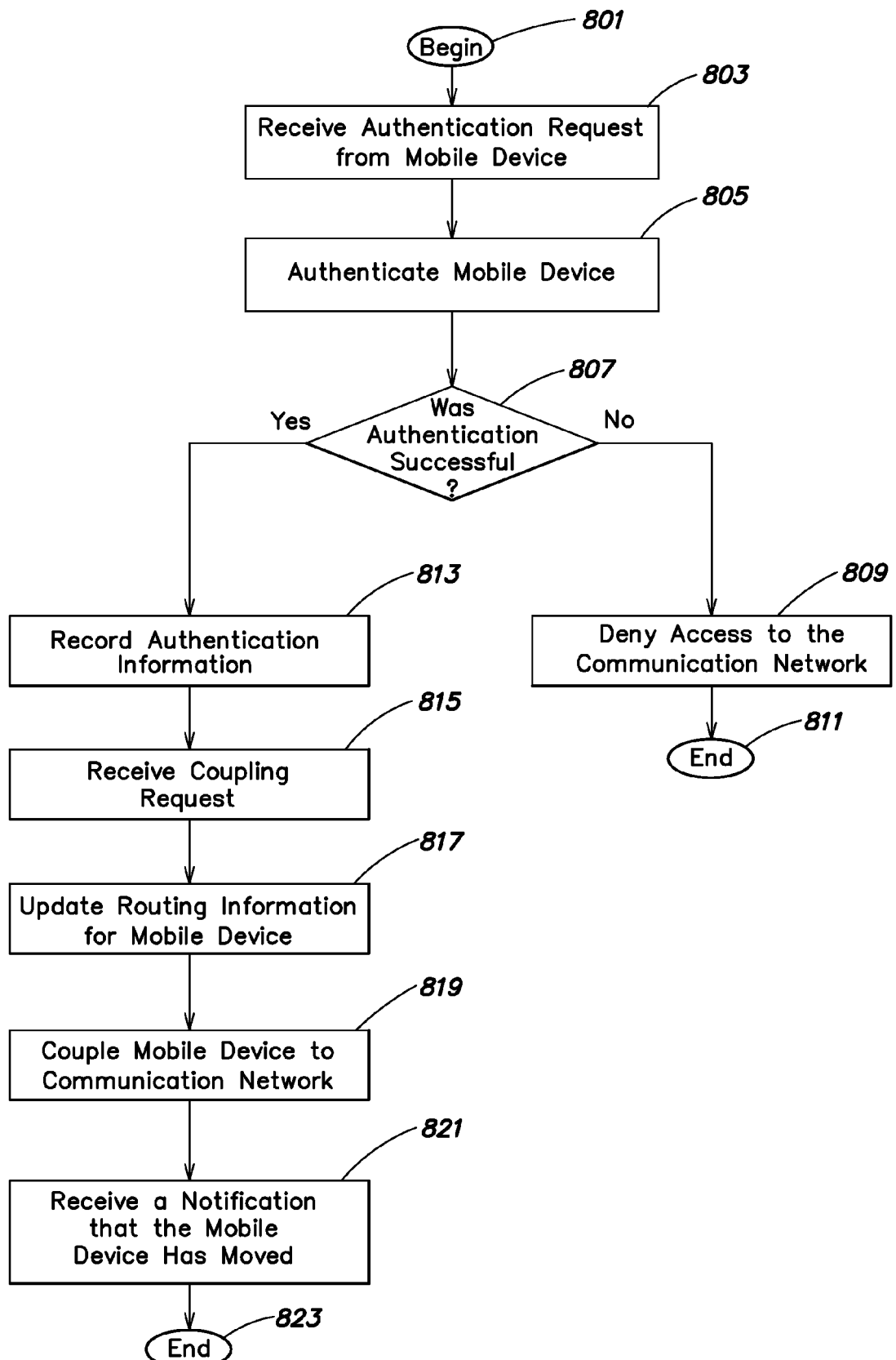
FIG. 8 illustrates a flow chart of an example process performed by a stationary access point consistent with principles of the present invention.
Figure 9:
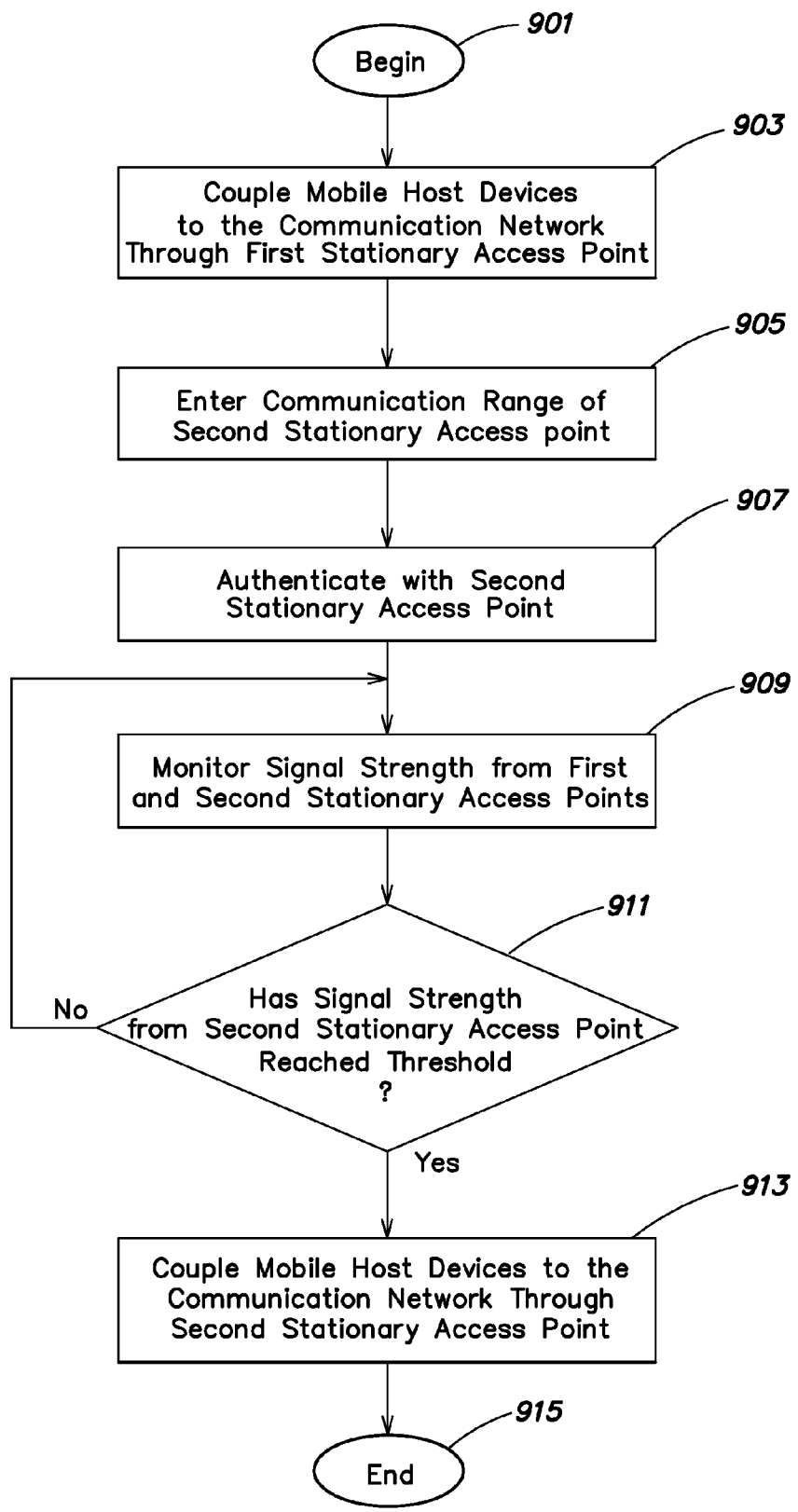
FIG. 9 illustrates a flow chart of an example process performed by a mobile access point consistent with principles of the present invention.

Referring to the flow charts of FIG. 8 and FIG. 9, which illustrate processes beginning at blocks 801 and 901 respectively, and the system shown in FIG. 5 and FIG. 7, the mobile access point 137 may begin the process being coupled to the communication network 101 through the first stationary access point 131. The mobile access point may couple the mobile devices 507, 511, 709, 711 to the communication network 101 through the first stationary access point 131 as is indicated in block 903 of the flow chart in FIG. 9.

A first host device 513 in the passenger car of FIG. 5, may attempt to communicate with the mobile access point 137 to authenticate and begin coupling to the communication network 101. When the host device 513 attempts to communicate with the mobile access point 137, the mobile access point 137 may first authenticate the host device 513. The authentication process may require a user of the host device 513 to enter a login and password. The authentication process may also be based on a physical address of the host device 513. To authenticate the host device 513, the mobile access point 137 transmits a request to the authentication server 105 through an ATM connection with the first stationary access point 131. The first stationary access point 131 may inspect the physical layer destination of the authentication request and forward it on to the authentication server 105 through the communication network 101. The authentication server 105 may receive the request, perform a query on the authentication database and respond to the request by transmitting an authentication response to the mobile access point 137 though the communication network 101, and first stationary access point 131 as ATM cells. When the mobile access point 137 receives the authentication response, if it includes a positive response, the mobile access point 137 may couple the host device 513 to the communication network 101 through the first stationary access point 131.

The mobile access point 137, having communicated with the host device 513 through one of its communication systems, now knows how to communicate with the host device 513 in the future (i.e., through that same communication system). The mobile access point 137 may store this information in an address table so that the host device's physical address is associated with the proper communication system. When data directed to the host device 513 is received by the mobile access point 137, the mobile access point 137 can determine which communication system to forward the data through by referencing the address table. The mobile access point 137 may then transmit a topology change notification (TCN) to the first stationary access point 131. The TCN indicates that the host device 513 (identified by its physical address) can be accessed though the mobile access point 137. The first stationary access point 131 may record this information in its address table indicating that it can communicate with the host device 513 through the communication system used to communicate with the mobile access point 137 (e.g., an antenna system such as the second antenna system 205 of the first exemplary stationary access point 201). The first stationary access point 131 may then transmit a TCN through the communication network 101 so other devices connected to the communication network 101 know how to communicate with the host device 513. Each device that receives the TCN may establish an ATM virtual circuit to the host device or the mobile access point 137 to be used to communicate with the host device.

The mobile access point 137 may reach a location when it is within the communication range of the second stationary access point 133 as illustrated by block 905. Relatively soon after entering the communication range of the second stationary access point 133, the mobile access point 137 may begin the process of transitioning to coupling to the communication network 101 through the second stationary access point 133 by authenticating itself with the second stationary access point 133 as indicated in block 907 of FIG. 9. The second stationary access point 133 may receive an authentication request from the mobile access point 137 as indicated in block 803 of FIG. 8. The second stationary access point 133 may transmit an authentication request to the authentication server 105 and/or an authentication cache if the second stationary access point 133 is part of a stationary access point group in order to authenticate the mobile access point 137 as indicated in block 805 of FIG. 8. The second stationary access point may take different actions depending on whether the authentication was successful, as indicated at block 807. If the second stationary access point 133 receives a rejection from the authentication request it may deny the mobile access point 137 access to the communication network as indicated in block 809 of FIG. 8. The process may then end at block 811. If the second stationary access point 133 receives a positive authentication response from the authentication server 105 or authentication cache, the second stationary access point 133 may record the authentication information, as indicated in block 813 FIG. 8, and await further communication from the mobile access point 137.

As the vehicle 501, and the mobile access point 137, move towards the second stationary access point 133 and away from the first stationary access point 131, the communication signal from the second stationary access point 133 may get stronger and the communication signal from the first stationary access point 131 may get weaker. The mobile access point 137 may monitor the signal strength of the first and second stationary access points as indicated in block 909 of FIG. 9.

At some point between the first and second stationary access points 131, 133, the mobile access point 137 may request to couple to the communication network 101 through the second stationary access point 133 instead of through the first stationary access point 131. As discussed above, the mobile access point 137 may send this request approximately when the strength of the communication signal from the second stationary access point 133 exceeds the strength of the communication signal from the first stationary access point 131. The second stationary access point 133 may receive this request, as indicated in block 815 of FIG. 8, and update its stored forwarding information and the forwarding information of other devices coupled to the communication network 101 as indicated in block 817 of FIG. 8, by, for example, establishing one or more new ATM virtual circuits.

To update the forwarding information of other devices, the second stationary access point 133 may transmit a TCN through the communication network 101. The TCN may indicate that the mobile access point 137 and any other devices coupled to the communication network 101 through the mobile access point (including the host device 513) are accessible through communication with the second stationary access point 133. Any devices connected to the communication network 101 may receive the TCN and update their address tables to reflect this change. Any ATM devices may create new virtual circuits to the mobile device based on the updated forwarding information.

After updating forwarding information, the second stationary access point may couple the mobile access point 137 to the communication network 101, as indicated in block 819 of FIG. 8, by transferring data between the mobile access point 137 and the communication network 101. When the signal strength of the second stationary access point 133 exceeds some desired threshold or level as indicated at block 911, the mobile access point 137 may then couple the mobile host devices 507, 511, 709, 711 to the communication network 101 through the second stationary access 133 point instead of the first stationary access point 131 as indicated in block 913 of FIG. 9. By following this procedure, data may be forwarded to the mobile access point 137 and any devices coupled to the communication network through the mobile access point 137 as it moves from one stationary access point to the next. The process of FIG. 9 may end at block 915.

If data is received by the communication network 101 (e.g., from the external network 125 or from a device coupled to the communication network 101) destined for the host device 513, the data may be forwarded through the communication network 101 through a plurality of forwarding devices (e.g., 117, 119), as discussed above. The forwarding devices (117, 119) may examine their respective address tables to determine how to forward the data based on only data link layer information. Using the information in the forwarding tables, the data may be quickly forwarded to the host device 513 over long distances as if the host devices were attached to a local network of the other devices coupled to the communication network 101.

The second stationary access point may continue to couple the mobile access point 137 to the communication network 101 until it receives a TCN indicating that the mobile access device has moved to a new stationary access point as indicated in block 821 of FIG. 8. The process may then end at block 823.

If the mobile access point 137 is coupled to the communication network 101 through the first stationary access point 131 when the data is received by the communication network 101 but the mobile access point 137 moves to couple to the communication network 101 through the second stationary access point 133 before the data reaches the mobile access point 137 or the host device 513, the data may not be forwarded properly to the host device 513. If the data does not reach the host device 513, data may be retransmitted to the communication network 101 in accordance with a transport layer protocol (e.g., layer 4 of the OSI protocol), such as transmission control protocol (TCP), as is well-known in the art.

It should be recognized that the above described embodiments are given as non-limiting examples only. Other embodiments may include any arrangement and/or configuration desired. For example, in one embodiment of the present invention, the stationary access points may themselves be arranged on a moving platform such as a train or other vehicle. The stationary access points may be configured to communicate with a mobile device that is relatively stationary compared to the moving stationary access points. The stationary access points may be arranged such that the mobile device is in communication with at least one stationary access point as the platform or vehicle passes near the mobile device.

Having thus described several aspects of at least one embodiment of this invention, it is to be appreciated various alterations, modifications, and improvements will readily occur to those skilled in the art. Such alterations, modifications, and improvements are intended to be part of this invention, and are intended to be within the scope of the invention. Accordingly, the foregoing description and drawings are by way of example only.

The invention claimed is:

1. A communication system comprising:
a plurality of stationary access points coupled to a communication network, each of the plurality of stationary access points having a communication range; and
a mobile access point including at least one antenna, the mobile access point being configured to communicate with the plurality of stationary access points and provide a plurality of host devices access to the communication network by at least in part transmitting a data link layer notification to at least one of the plurality of stationary access points, the notification indicating that at least one of the plurality of host devices is accessible via the mobile access point.

2. The communication system of claim 1, wherein the mobile access point communicates with at least one of the plurality of host devices using a wireless network.

3. The communication system of claim 2, wherein the wireless network includes a wireless network using an IEEE 802.11 protocol.

4. The communication system of claim 1 wherein the mobile access point communicates with the plurality of stationary access points using a wireless network.

5. The communication system of claim 4, wherein the wireless network includes a wireless network using an IEEE 802.11 protocol.

6. The communication system of claim 4, wherein the mobile access point is configured to provide the plurality of host, devices access to the communication network through the wireless network to one stationary access point of the plurality of stationary access points at a time.

7. The communication system of claim 6, wherein the one stationary access point is a stationary access point of the plurality of stationary access points that provides a stronger wireless communication signal to the mobile access point than at least one other stationary access point of the plurality of stationary access points.

8. The communication system of claim 1, wherein, to provide access to the communication network to at least one of the plurality of host devices, the mobile access point communicates through a wireless network with a mobile forwarding device.

9. The communication system of claim 1, wherein the communication network is connected to an external communication network by a forwarding device.

10. The communication system of claim 9, wherein the forwarding device includes an edge router.

11. The communication system of claim wherein data addressed to a network layer address of a first host device of the plurality of host devices and received by the forwarding device from the external communication network is forwarded from the forwarding device to the first host device through the mobile access point and at least one of the plurality of stationary access points based on a data link layer address of the first host device.

12. The communication system of claim 1, wherein the plurality of host devices includes at least one of a laptop computer, a personal digital assistant (PDA), and a cellular telephone.

13. The communication system of claim 1, wherein at least one of the plurality of stationary access points couples to the communication network through a wired connection.

14. The communication system of claim 1, wherein a first stationary access point of the plurality of stationary access points couples to the communication network through a second stationary access point of the plurality of stationary access points.

15. The communication system of claim 14, wherein the first stationary access point couples to the communication network using a wired network to the second stationary access point.

16. The communication system of claim 14, wherein the first stationary access point couples to the communication network using a wireless network to the second stationary access point.

17. The communication system of claim 1, wherein the mobile access point is coupled to a train.

18. The communication system of claim 17, wherein the vehicle moves along a path, and wherein the plurality of stationary access points are arranged adjacent to the path.

19. A method of forwarding data to a moving host device, the method comprising acts of:
maintaining, in at least one first forwarding device of a plurality of forwarding devices of a communication network, forwarding information for the moving host device based on a data link layer address of the moving host device, at least one of the plurality of forwarding devices having a communication range, the at least one first forwarding, device comprising a mobile access point including at least one antenna;
transmitting, by the at least one first forwarding device via the at least one antenna to a stationary forwarding device of the plurality of forwarding devices, a data link layer notification indicating that the moving host device is accessible via the at least one first forwarding device;
receiving data addressed to a network layer address of the moving host device at the at least one first forwarding device; and
forwarding, based on the maintained forwarding information, a representation of at least a portion of the received data along a path to the data link layer address of the moving host device.

20. The method of claim 19, further comprising an act of addressing, at the at least one first forwarding device, the representation of at least the portion of the received data to the data link layer address of the moving host device.

21. The method of claim 20, wherein the act of forwarding comprises an act of forwarding the representation using ATM local area network emulation (LANE) to the moving host device.

22. The method of claim 19, wherein the at least one first forwarding device includes at least one stationary access point.

23. The method of claim 22, wherein the at least one stationary access point includes a first stationary access point when the moving host device is in a first position and a second stationary access point when the moving host device is in a second position.

24. The method of claim 23, further comprising establishing a first wireless connection between the first, stationary access point and the mobile access point when the moving host device is in the first position and establishing a second wireless connection between the second stationary access point and the mobile access point when the moving host device is in the second position.

25. The method of claim 19, wherein the moving host device includes at least one of a laptop computer, a personal digital assistant (PDA), and a cellular telephone.

26. The method of claim 19, wherein the act of forwarding comprises an act of forwarding a plurality of autonomous transfer mode (ATM) cells, wherein each of the cells includes at least a portion of the representation of the portion of the received data.

* * * * *

UNITED STATES PATENT AND TRADEMARK OFFICE
CERTIFICATE OF CORRECTION

| | | |
|---|---|---|
| PATENT NO. | : 8,971,300 B2 | Page 1 of 1 |
| APPLICATION NO. | : 12/841491 | |
| DATED | : March 3, 2015 | |
| INVENTOR(S) | : Cooper G. Lee | |

It is certified that error appears in the above-identified patent and that said Letters Patent is hereby corrected as shown below:

In the Claims:

Column 37, claim 6, line 56, delete "," after "host".

Column 38, claim 11, line 9, insert --9,-- between "claim" and "wherein".

Signed and Sealed this
Second Day of June, 2015

Michelle K. Lee
*Director of the United States Patent and Trademark Office*